US008320222B2

(12) United States Patent
Nakano et al.

(10) Patent No.: US 8,320,222 B2

(45) Date of Patent: Nov. 27, 2012

(54) SEMICONDUCTOR INTEGRATED CIRCUIT AND DISK RECORDING AND REPRODUCING DRIVE USING THE SAME

(75) Inventors: Norihiko Nakano, Fujisawa (JP); Hajime Ishihara, Chigasaki (JP); Akio Fukushima, Yokohama (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 13/035,843

(22) Filed: Feb. 25, 2011

(65) Prior Publication Data

US 2011/0211431 A1 Sep. 1, 2011

(30) Foreign Application Priority Data

Feb. 26, 2010 (JP) ................................ 2010-042589

(51) Int. Cl.
*G11B 7/00* (2006.01)

(52) U.S. Cl. .................................................... 369/47.32

(58) Field of Classification Search ............... 369/44.27, 369/44.34, 44.14, 47.54, 44.29, 47.32, 47.33, 369/47.34, 44.28

See application file for complete search history.

(56) References Cited

U.S. PATENT DOCUMENTS

| | | | | |
|---|---|---|---|---|
| 6,687,199 | B1 * | 2/2004 | Tran et al. | 369/44.14 |
| 7,885,151 | B1 * | 2/2011 | Mitchem et al. | 369/44.34 |
| 2005/0024998 | A1 * | 2/2005 | Inoue et al. | 369/44.29 |
| 2005/0213453 | A1 * | 9/2005 | Hojo et al. | 369/47.54 |

FOREIGN PATENT DOCUMENTS

| | | | |
|---|---|---|---|
| JP | 2002-25194 | A | 1/2002 |
| JP | 2005-63584 | A | 3/2005 |

* cited by examiner

*Primary Examiner* — Nabil Hindi

(74) *Attorney, Agent, or Firm* — Miles & Stockbridge P.C.

(57) ABSTRACT

The present invention enables a comprehensive evaluation from both of data read from a disk and a servo signal of a servo controller. The present invention provides a semiconductor integrated circuit mountable to a disk recording and reproducing drive, which comprises a signal processor of an RF signal read from a pickup, a servo controller responsive to a servo error signal read from the pickup, a memory controller, and an external interface. The memory controller is supplied with read data and a servo signal and stores the read data and the servo signal in a buffer memory according to a time division process. The read data and the servo signal stored in the buffer memory can be transferred to an external device via the external interface by the memory controller.

45 Claims, 19 Drawing Sheets

Fig.11

| SETTING PROCESS | SETTING PARAMETER | |
|---|---|---|
| BUFFER MEMORY SETTING | START ADDRESS ADRS1 | |
| | END ADDRESS ADRS2 | |
| SERVO MONITOR SIGNAL SETTING | TYPE OF SERVO MONITOR SIGNAL | TYPE OF WAVEFORM DATA |
| | | TYPE OF LOGIC SIGNAL |
| | | TYPE OF STATUS INFORMATION |
| | NUMBER OF SERVO MONITOR SIGNALS | NUMBER OF WAVEFORM DATA |
| | | NUMBER OF LOGIC SIGNALS |
| | | NUMBER OF STATUS INFORMATION |
| | WAVEFORM DATA BIT PRECISION | |
| | OUTPUT DATA FORMAT SIZE | |
| SAMPLING SETTING | SAMPLING FREQUENCY SET VALUE | FREQUENCY f1 SET VALUE |
| | | FREQUENCY f2 SET VALUE |
| | | FREQUENCY f3 SET VALUE |
| | | FREQUENCY f4 SET VALUE |
| | | FREQUENCY f5 SET VALUE |

Fig.12

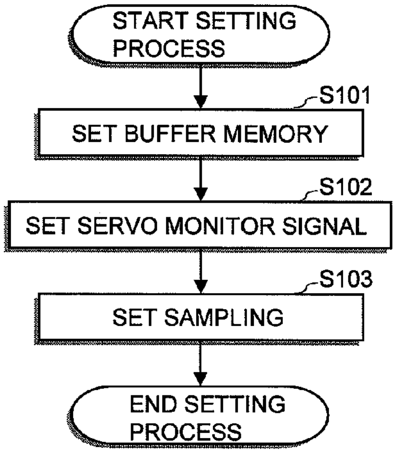

| SETTING PROCESS | SETTING PARAMETER | |
|---|---|---|
| TRIGGER CONDITION SETTING | TRIGGER DETERMINATION TARGET SIGNAL 0601 | |
| | TRIGGER EDGE 0602 | RISING EDGE |
| | | FALLING EDGE |
| | | BIDIRECTIONAL EDGES |
| | TRIGGER LEVEL 0603 | |
| | DELAY TIME 0604 | |

SEMICONDUCTOR INTEGRATED CIRCUIT AND DISK RECORDING AND REPRODUCING DRIVE USING THE SAME

CLAIM OF PRIORITY

The present application claims priority from Japanese application JP 2010-042589 filed on Feb. 26, 2010, the content of which is hereby incorporated by reference into this application.

FIELD OF THE INVENTION

The present invention relates to a semiconductor integrated circuit and a disk recording and reproducing drive using the same, and in particular to a technology effective in enabling a comprehensive evaluation from both data read from a disk and an internal signal of a servo controller.

BACKGROUND OF THE INVENTION

In an optical disk recording and reproducing drive which records/reproduces information of optical disks such as a CD (Compact Disk), a DVD (Digital Versatile Disk), a BD (Blu-Ray Disk), etc., laser light emitted from an optical pickup is applied onto an optical disk recording surface and its reflected light is detected by the optical pickup, so that an RF analog reproduction signal is generated. The recording and reproduction of such an optical disk recording and reproducing drive needs various control such as spindle drive, tracking control, focus control, etc. For various control, the RF analog detection signal detected by the optical pickup is converted to a digital signal by an A/D converter of a semiconductor integrated circuit, which in turn is subjected to digital signal processing inside the semiconductor integrated circuit.

A patent document 1 has described that measured data read from digital signal recording mediums such as a CD and a DVD are sequentially stored in a memory, and the data stored in the memory are outputted via an interface to a host device by which the result of measurement is displayed. This technology enables no need for a conventional expensive dedicated measuring device.

A patent document 2 has described that in order to measure various signals inside a servo controller without dismounting a disk recording and reproducing drive in the disk recording and reproducing drive, a monitor controller determines which internal signal in the servo controller should be output by a detection device. In a test mode, the internal signal of the servo controller outputted from the monitor controller is outputted to its corresponding external detection device via a selector, an audio output D/A converter and an audio output terminal.

Patent Document 1

Japanese Unexamined Patent Publication No. 2002-25194

Patent Document 2

Japanese Unexamined Patent Publication No. 2005-63584

SUMMARY OF THE INVENTION

Prior to the present invention, the present inventors have been engaged in the research/development of a semiconductor integrated circuit mounted to an optical disk recording and reproducing drive that records/reproduces information about an optical disk such as a CD, a DVD, a BD or the like. In the process of this research/development, the present inventors have carried out a study about the technology described in the patent document 2 prior to the present invention. As a result, according to the technology described in the patent document 2, it has been revealed that various signals in the servo controller can be measured without dismounting the optical disk recording and reproducing drive, and the technology is effective not only in suppressing a change in the characteristic of the optical disk recording and reproducing drive due to it dismounting but also in reducing time and efforts for its dismounting.

That is, the technology described in the patent document 2 shows that in a normal mode, disk read data is selected by the selector, whereas in a test mode, an internal signal of the servo controller is selected by the selector and outputted to the external detection device. In this technology, however, the problem that the disk read data and the internal signal of the servo controller cannot be measured by the external detection device in the test mode, has been revealed by the studies of the present inventors. Namely, in order to evaluate the disk recording and reproducing drive, there is a need to comprehensively evaluate the disk recording and reproducing drive from both the read data of the disk and the internal signal of the servo controller in the test mode.

The present invention has been made as a result of the studies by the present inventors prior to the present invention referred to above.

It is thus an object of the present invention to enable a comprehensive evaluation from both read data of a disk and a servo signal of a servo controller.

The above and other objects and novel features of the present invention will be apparent from the description and the accompanying drawings of the specification.

Typical ones of the inventive aspects disclosed in this application will be briefly described as follows:

A typical embodiment of the present invention is a semiconductor integrated circuit (LSI) mountable to a disk recording and reproducing drive (0001) comprising a spindle motor (0102) which rotatably drives a disk (0101), a pickup (0104) which executes a writing of data onto the disk and a reading of data from the disk, a pickup drive motor (0103) which drives the pickup, and a buffer memory (0109) which stores therein the data read from the disk and the data written onto the disk.

The semiconductor integrated circuit comprises a signal processor (0107) which generates the read data according to a process of an RF signal read from the pickup by the data reading, and a servo controller (0106) which controls the spindle motor, the pickup and the pickup drive motor in response to a servo error signal read from the pickup.

The semiconductor integrated circuit further comprises a memory controller (0108) supplied with the read data (A002) generated from the signal processor and a servo signal (A001) generated from the servo controller and coupled to the buffer memory, and an external interface (0110) coupleable to an external device (0002) of the semiconductor integrated circuit and coupled to the memory controller.

The memory controller (0108) is capable of storing the read data (A002) and the servo signal (A001) in the buffer memory (0109) according to a time division process and transferring the read data and the servo signal stored in the buffer memory according to the time division process to the external device through the external interface (refer to FIG. 1).

An advantageous effect obtained by a typical one of the inventive aspects disclosed in the present application will be briefly described as follows:

According to the present invention, a comprehensive evaluation is enabled from both of data read from a disk and a servo signal of a servo controller.

BRIEF DESCRIPTION OF THE DRAWINGS

FIG. 11 is a diagram depicting setting processes and parameters for observing a servo monitor signal A001 in the optical disk drive 0001 according to the first embodiment of the present invention shown in FIGS. 1 through 10;

FIG. 12 is a diagram showing a setting process flow for observing the servo monitor signal A001 in the optical disk drive 0001 according to the first embodiment of the present invention shown in FIGS. 1 through 11;

DETAILED DESCRIPTION OF THE PREFERRED EMBODIMENTS

1. Summary of the Preferred Embodiments

Figure 1:
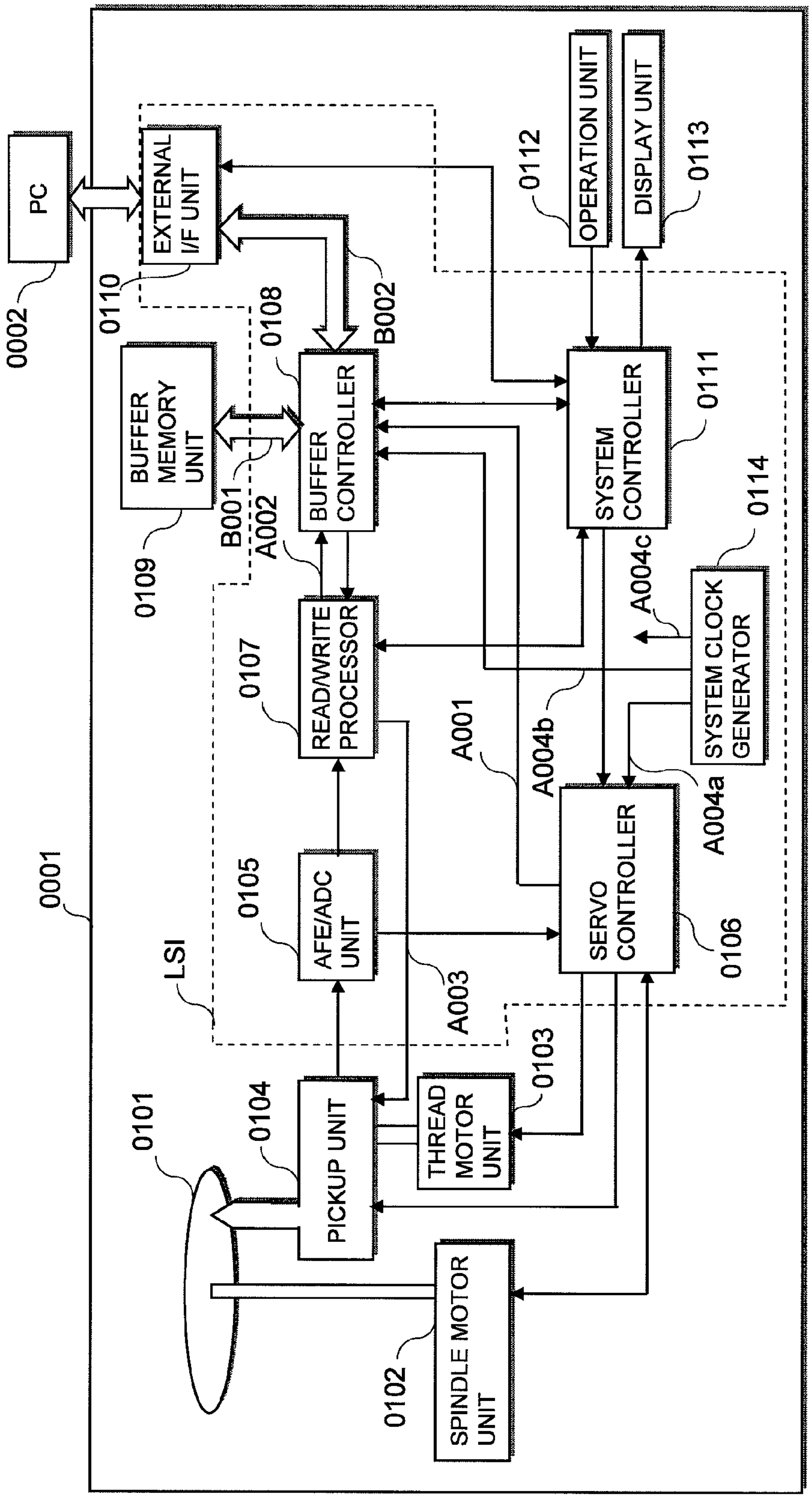
FIG. 1 is a diagram showing a configuration of an optical disk recording and reproducing drive according to a first embodiment of the present invention.

Summary of typical embodiments of the invention disclosed in the present application will first be explained. Reference numerals of the accompanying drawings referred to with parentheses in the description of the summary of the typical embodiments only illustrate elements included in the concept of components to which the reference numerals are given.

[1] There is provided a semiconductor integrated circuit (LSI) mountable to a disk recording and reproducing drive equipped with a spindle motor (0102) capable of rotatably driving a disk (0101), a pickup (0104) capable of executing a writing of data onto the disk and a reading of data from the disk, a pickup drive motor (0103) capable of driving the pickup, and a buffer memory (0109) capable of storing therein the data read from the disk and the data written onto the disk.

The semiconductor integrated circuit includes a signal processor (0107) capable of generating the read data according to a process of an RF signal read from the pickup by the data reading, and a servo controller (0106) capable of controlling the spindle motor, the pickup and the pickup drive motor in response to a servo error signal read from the pickup.

The semiconductor integrated circuit further includes a memory controller (0108) supplied with the read data (A002) generated from the signal processor and a servo signal (A001) generated from the servo controller and coupleable to the buffer memory, and an external interface (0110) coupleable to an external device (0002) of the semiconductor integrated circuit and coupled to the memory controller.

The memory controller (0108) is capable of storing the read data (A002) and the servo signal (A001) in the buffer memory (0109) according to a time division process and transferring the read data and the servo signal stored in the buffer memory according to the time division process to the external device through the external interface (refer to FIG. 1).

According to the embodiment, a comprehensive evaluation is enabled from both the data read from the disk and the servo signal of the servo controller.

In a preferred embodiment, an output data rate (DRAE1, 3) of the read data (A101) and the servo signal (A102) stored in the buffer memory (0109) by the memory controller (0108) according to the time division process can be set to a rate higher than an input data rate (DRATE 2, 4) of the read data (A002) and the servo signal (A001) supplied from the signal processor (0107) and the servo controller (0106) to the memory controller (0108).

Figure 8:
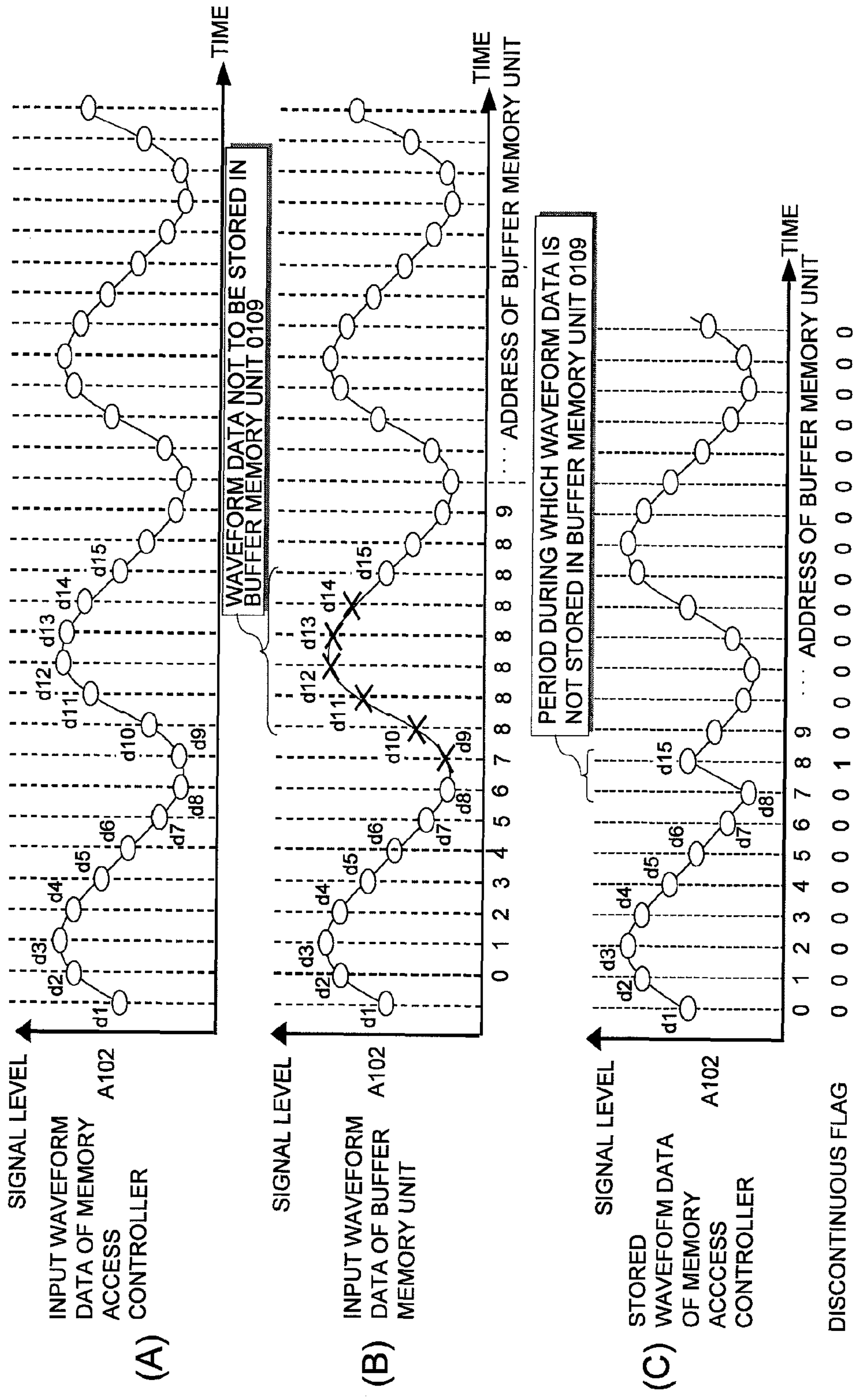
FIG. 8 is a diagram showing changes in memory address when discontinuity occurs in data stored in a buffer memory unit 0109 in the optical disk drive 0001 according to the first embodiment of the present invention shown in FIGS. 1 through 5.

In another preferred embodiment, when a period of a store interrupt has occurred in either of the read data and the servo signal stored in the buffer memory by the memory controller according to the time division process, the memory controller adds flag information indicative of the occurrence of the store interrupt to either thereof and stores the same in the buffer memory (refer to FIG. 8).

Figure 9:
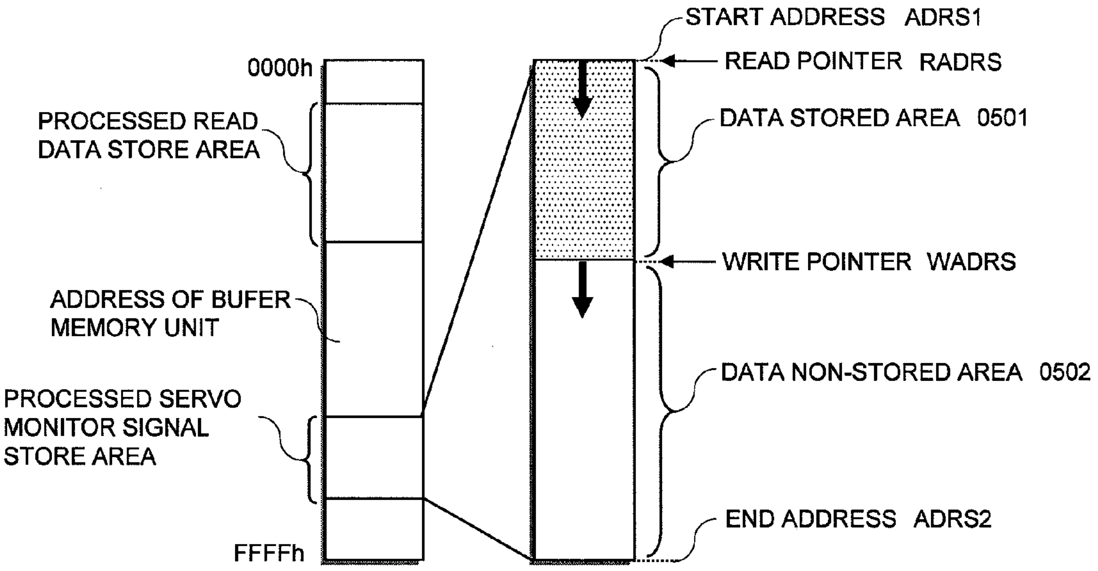
FIG. 9 is a diagram illustrating one example of address settings in a processed servo monitor signal store area lying inside the buffer memory unit 0109 in the optical disk drive 0001 according to the first embodiment of the present invention shown in FIGS. 1 through 8.
Figure 10:
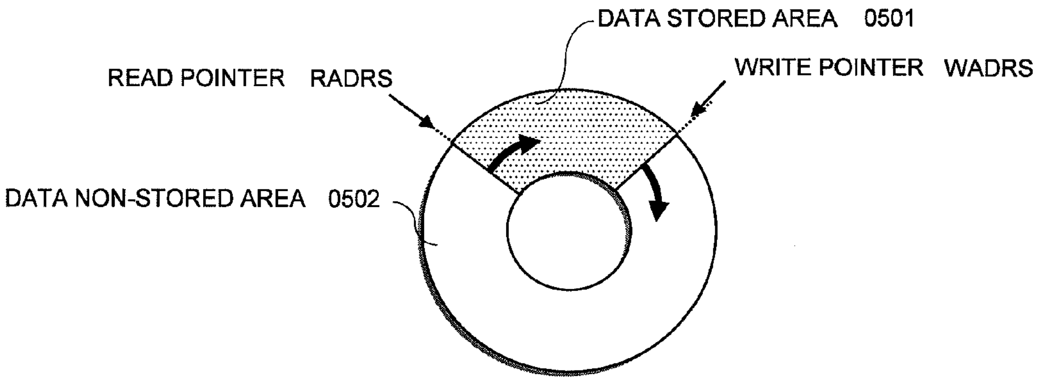
FIG. 10 is a diagram showing the manner in which the buffer memory unit 0109 is configured as a ring buffer in the optical disk drive 0001 according to the first embodiment of the present invention shown in FIGS. 1 through 9.

In a more preferred embodiment, the servo signal (A001) can be stored in a ring buffer configured in the buffer memory (0109) by the memory controller (0108) (refer to FIGS. 9 and 10).

In another more preferred embodiment, the memory controller (0108) detects whether an amplitude level of the servo signal (A102) stored in the ring buffer exceeds a predetermined value (0603).

Figure 16:
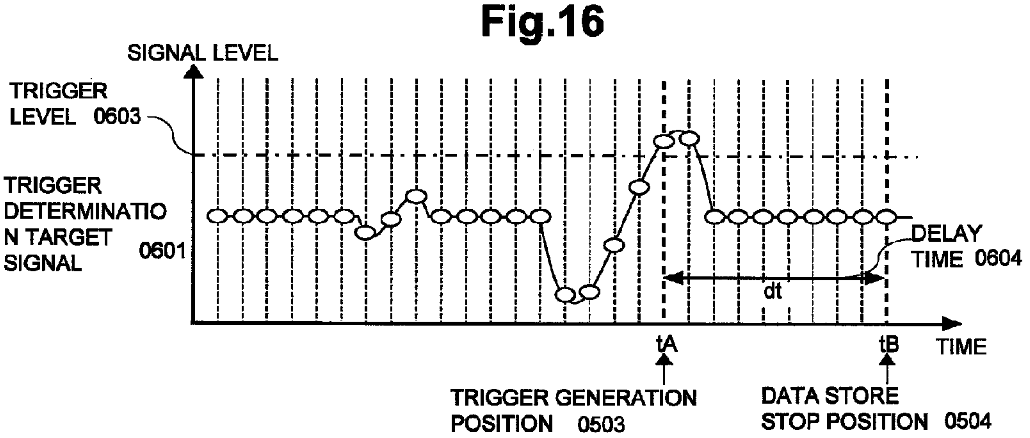
FIG. 16 is a diagram showing a trigger operation of the optical disk drive according to the second embodiment of the present invention shown in FIGS. 13 through 15.

The memory controller starts the storage of the servo signal in the ring buffer in response to the amplitude level having exceeded the predetermined value and stops the storage of the servo signal in the ring buffer after a predetermined time (dt) has elapsed (refer to FIG. 16).

Figure 21:
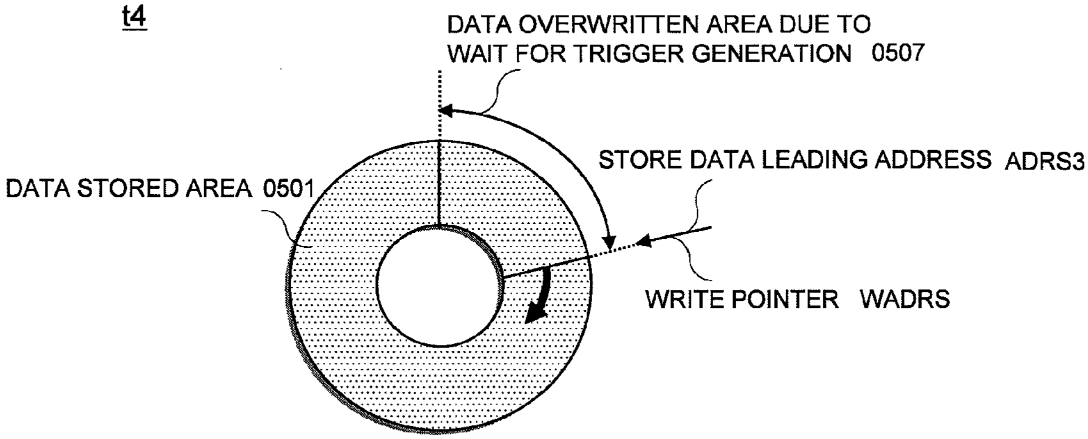
FIG. 21 is a diagram depicting an internal state of the buffer memory unit 0109 configured by the ring buffer at a time t4 in the optical disk drive according to the second embodiment of the present invention shown in FIGS. 13 through 17.

In a further preferred embodiment, when the servo signal (A0102) exceeds one round of the ring buffer before the memory controller starts the storage of the servo signal in the ring buffer in response to the amplitude level having exceeded the predetermined value, the memory controller (0108) performs overwriting with data equivalent to the excess of one round thereof onto a data stored area of the ring buffer (refer to FIG. 21).

In a concrete embodiment, the signal processor (0107) executes a decode process and an error correction process for generating the read data (refer to FIG. 1).

In another concrete embodiment, the buffer memory (0109) is a dynamic random access memory.

In a further concrete embodiment, the dynamic random access memory is a synchronous dynamic random access memory.

In the most concrete embodiment, the synchronous dynamic random access memory is built in the semiconductor integrated circuit (LSI).

[2] A typical embodiment of another aspect of the present invention is a disk recording and reproducing drive equipped with a spindle motor (0102) capable of rotatably driving a disk (0101), a pickup (0104) capable of executing a writing of data onto the disk and a reading of data from the disk, a pickup drive motor (0103) capable of driving the pickup, a buffer memory (0109) capable of storing therein the data read from the disk and the data written onto the disk, and a semiconductor integrated circuit (LSI).

The semiconductor integrated circuit includes a signal processor (0107) capable of generating the read data according to a process of an RF signal read from the pickup by the data reading, and a servo controller (0106) capable of controlling the spindle motor, the pickup and the pickup drive motor in response to a servo error signal read from the pickup.

The semiconductor integrated circuit further includes a memory controller (0108) supplied with the read data (A002) generated from the signal processor and a servo signal (A001) generated from the servo controller and coupleable to the buffer memory, and an external interface (0110) coupleable to an external device (0002) of the semiconductor integrated circuit and coupled to the memory controller.

The memory controller (0108) is capable of storing the read data (A002) and the servo signal (A001) in the buffer memory (0109) according to a time division process and transferring the read data and the servo signal stored in the buffer memory according to the time division process to the external device through the external interface (refer to FIG. 1).

According to the embodiment, a comprehensive evaluation is enabled from both the data read from the disk and the servo signal of the servo controller.

2. Further Detailed Description of the Preferred Embodiments

Preferred embodiments will next be explained in further details. Incidentally, in all the drawings for describing the best modes for implementing the invention, the same reference numerals are respectively attached to components having the same functions as those in the drawings, and their repetitive explanations will therefore be omitted.

First Embodiment

Configuration of Optical Disk Recording and Reproducing Drive

FIG. 1 is a diagram showing a configuration of an optical disk recording and reproducing drive according to a first embodiment of the present invention.

In FIG. 1, the optical disk drive 0001 is coupled to a personal computer (hereinafter called "PC") 0002.

The optical disk drive 0001 includes an optical disk 0101, a spindle motor unit 0102, a thread motor unit 0103, a pickup unit 0104, an analog front end/analog to digital converter unit (hereinafter called "AFE/ADC unit") 0105, a servo controller 0106, a read/write processor 0107, a buffer controller 0108, a buffer memory unit 0109, an external interface unit (hereinafter called "external I/F unit") 0110, a system controller 0111, an operation unit 0112, a display unit 0113, and a system clock generator 0114. Incidentally, the AFE/ADC unit 0105, servo controller 0106, read/write processor 0107, buffer controller 0108, system controller 0111 and system clock generator 0114 are integrated into a semiconductor chip of a semiconductor integrated circuit LSI.

In the optical disk drive 0001, the pickup unit 0104 applies laser light to the optical disk 0101 corresponding to an information recording medium, and on the other hand generates an electric signal by photoelectric conversion of reflected light. Optical disks such as a CD, a DVD, a BD, etc. can be used as the optical disk 0101. Further, a magneto-optical disk, a magnetic disk, a hologram disk, etc. can be used.

The pickup unit 0104 executes control such as focus servo, tracking servo or the like, based on control from the servo controller 0106 to thereby execute processing such as track follow-up, track movement or the like. The pickup unit 0104 applies laser light to the optical disk 0101, based on write data A003 outputted from the read/write processor 0107 and the control from the servo controller 0106 and thereby records the write data A003 onto the optical disk 0101.

The AFE/ADC unit 0105 is comprised of an amplifier, an analog-digital converter, a servo error signal detection circuit and the like. The AFE/ADC unit 0105 generates a servo error signal and an RF signal from the electric signal outputted from the pickup unit 0104 and converts them into digital form, which in turn are outputted to the servo controller 0106 and the read/write processor 0107 respectively.

The servo controller 0106 calculates a servo control signal from the servo error signal outputted from the AFE/ADC unit 0105, based on control from the system controller 0111 and supplies the servo control signal to the spindle motor unit 0102, thread motor unit 0103 and pickup unit 0104 to thereby execute control of servo operations. The servo controller 0106 outputs a servo error calculation signal and a servo calculation control signal in the servo controller 0106, and a signal indicative of an internal operating state of the servo controller 0106 as a servo monitor signal A001 in such a manner that they can be observed outside the optical disk drive 0001 by a method to be described later. The servo error calculation signal includes a servo error signal outputted from the AFE/ADC unit 0105, a signal being in the course of an arithmetic operation inside the servo controller 0106, a servo control signal, etc. The servo calculation control signal is of a signal used for control of the internal calculation of the servo controller 0106. Further, the servo controller 0106 controls the rotational speed of the optical disk 0101, based on a signal indicative of an operating state of the spindle motor unit 0102, which is outputted from the spindle motor unit 0102.

The spindle motor unit 0102 executes control on the rotation of the optical disk 0101, based on the control of the servo controller 0106. Also, the spindle motor unit 0102 outputs the signal indicative of the operating state thereof to the servo controller 0106.

The thread motor unit 0103 executes control on the movement of the pickup unit 0104 in a track direction, based on the control from the servo controller 0106. Also, the thread motor unit 0103 is capable of outputting a signal indicative of its operating state to the servo controller 0106. In such a case, the servo controller 0106 executes control of the thread motor unit 0103, based on this signal.

The read/write processor 0107 is comprised of an encode/decode unit and an error correction processor or the like. The read/write processor 0107 executes processing such as decoding, an error correction, etc. on the digitized RF signal outputted from the AFE/ADC unit 0105 to thereby generate read data A002 and supplies the same to the buffer controller 0108. Also, the read/write processor 0107 executes reproduction or playback signal processes such as a partial response maximum likelihood (PRML) signal process, a Viterbi decoding process, etc. Further, the read/write processor 0107 performs addition of an error correction code and encode processing on user data supplied from the buffer controller 0108 to thereby generate write data A003 and supplies the same to the pickup unit 0104. Furthermore, the read/write processor 0107 detects an address for the optical disk 0101, which is contained in the read data A002 and supplies the same to the system controller 0111 and the buffer controller 0108.

The buffer controller 0108 stores, based on the control of the system controller 0111, the read data A002 supplied from the read/write processor 0107 and the servo monitor signal A001 supplied from the servo controller 0106 in the buffer memory unit 0109 through a memory bus B001. The data to be stored in the buffer memory unit 0109 will hereinafter be called "store data". Also, the buffer controller 0108 loads the stored read data A002 and servo monitor signal A001 from the buffer memory unit 0109 and outputs the loaded read data A002 and servo monitor signal A001 to the external I/F unit 0110 through an input/output data bus B002. The data loaded from the buffer memory unit 0109 is referred to as "load data". Further, the buffer controller 0108 supplies a signal indicative of its operating state to the system controller 0111. Furthermore, the buffer controller 0108 stores user data supplied from the external I/F unit 0110 through the input/output data bus B002 in the buffer memory unit 0109 and supplies the user data stored in the buffer memory unit 0109 to the read/write processor 0107.

The buffer memory unit 0109 is comprised of a synchronous dynamic random access memory. A semiconductor chip for the synchronous dynamic random access memory is configured as a chip different from a semiconductor chip for a semiconductor integrated circuit LSI.

The external I/F unit 0110 executes the transfer of control instructions between the PC 0002 and the system controller 0111, based on control from the PC 0002 and the system controller 0111 and on the other hand, transfers the load data outputted from the buffer controller 0108 to the PC 0002. Also, the external I/F unit 0110 transfers user data supplied from the PC 0002 to the buffer controller 0108.

The system controller 0111 controls the read/write processor 0107, the servo controller 0106, the buffer controller 0108 and the display unit 0113, based on control indicated by the control instructions supplied from the PC 0002 through the external I/F unit 0110 and the signal indicative of the operating state of the buffer controller 0108 from the buffer controller 0108 to thereby execute a recording and reproducing process of the optical disk drive 0001 and a process for outputting the servo monitor signal A001 to the external PC 0002. The control instructions for controlling the system controller 0111 can be supplied from the external I/F unit 0110 to the system controller 0111 as described above. The control instructions can be stored in the buffer memory unit 0109 from the external I/F unit 0110 via the buffer controller 0108. They can be loaded from the buffer memory unit 0109 and supplied to the system controller 0111 through the buffer controller 0108. The system controller 0111 supplies a response relative to each control instruction supplied from the PC 0002 via the external I/F unit 0110, to the PC 0002 through the external I/F unit 0110. Such a response relative to the control instruction can also be supplied via the buffer controller 0108 and the buffer memory unit 0109. Further, the system controller 0111 controls a load/unload operation of an optical disk insertion part (not shown) of the optical disk drive 0001, based on a load/unload instruction signal for the optical disk insertion part from the operation unit 0112. The operation unit 0112 is a user interface for operating the operation of the optical disk drive such as the load/unload operation or the like of the optical disk insertion part of the optical disk drive 0001. The operation unit 0112 supplies the load/unload instruction signal or the like for the optical disk insertion part to the system controller 0111 in accordance with the operation of a user.

The display unit 0113 displays the state of operation of the optical disk drive 0001, based on the control of the system controller 0111. The display unit 0113 is used to display characters and symbols using a light-emitting diode (LED), a liquid crystal display device (LCD) or the like.

The system clock generator 0114 is comprised of a crystal oscillator, a divider and the like. The system clock generator 0114 generates system clock signals A004*a*, A004*b* and A004*c* taken as master clocks used inside the optical disk drive 0001 and supplies them to the servo controller 0106, the buffer controller 0108 and other controllers respectively.

In the optical disk drive 0001 according to the first embodiment of the present invention, the servo error calculation signal, the servo calculation control signal and the signal indicative of the internal operating state of the servo controller 0106 all of which are used inside the servo controller 0106, can be outputted as the servo monitor signal A001 and stored in the buffer memory unit 0109. As a result, the servo monitor signal A001 can be transferred to the PC 0002 lying outside the optical disk drive 0001 using hardware for transferring the read data A002 read from the optical disk 0101 and stored in the buffer memory unit 0109 to the PC 0002 outside the optical disk drive 0001.

<<Servo Controller and Buffer Controller>>

Figure 2:
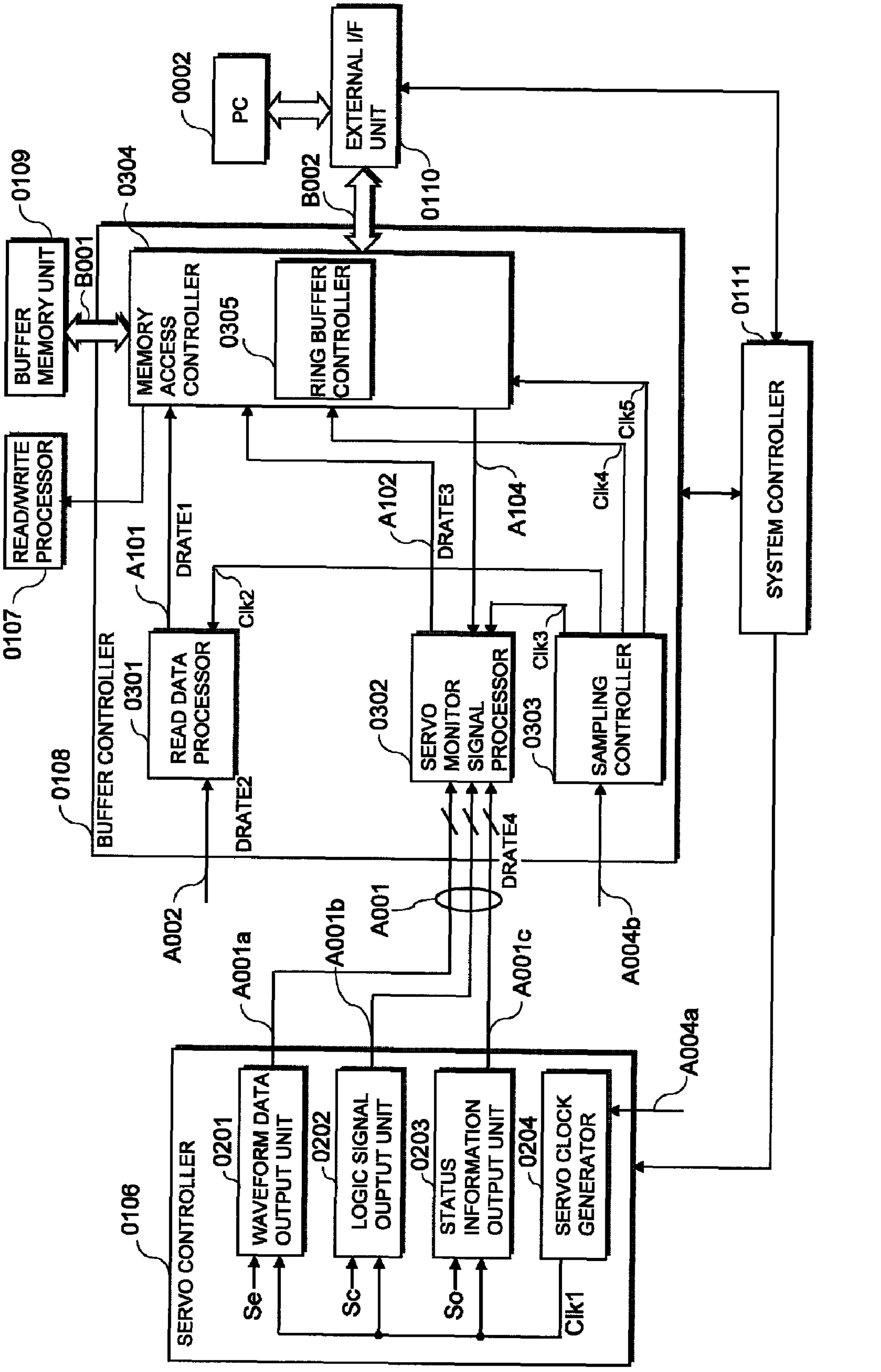
FIG. 2 is a diagram illustrating a detailed internal configuration of a servo controller 0106 and a buffer controller 0108 included in the optical disk drive 0001 according to the first embodiment of the present invention shown in FIG. 1.

FIG. 2 is a diagram showing a detailed internal configuration of the servo controller 0106 and the buffer controller 0108 included in the optical disk drive 0001 according to the first embodiment of the present invention shown in FIG. 1.

As shown in FIG. 2, the servo controller 0106 includes a waveform data output unit 0201, a logic signal output unit 0202, a status information output unit 0203 and a servo clock generator 0204. The buffer controller 0108 includes a read data processor 0301, a servo monitor signal processor 0302, a sampling controller 0303, a memory access controller 0304 and a ring buffer controller 0305. In FIG. 2, A001*a* is waveform data, A001*b* is a logic signal, A001*c* is status information, A101 is processed read data, A102 is a processed servo monitor signal, and A104 is a buffer control status signal, respectively. The servo monitor signal A001 in FIG. 1 is used as a signal including the waveform data A001*a*, the logic signal A001*b* and the status information A001*c* in FIG. 2.

In the servo controller 0106, the servo clock generator 0204 is comprised of a multiplying circuit, a division circuit and the like. The servo clock generator 0204 executes a multiplying process of the system clock signal A004*a* generated from the system clock generator 0114 and a dividing process thereof, based on the control of the system controller 0111 to thereby generate a servo clock signal Clk1 having a frequency f1 and supplies it to the waveform data output unit 0201, the logic signal output unit 0202 and the status information output unit 0203. Incidentally, the servo clock generator 0204 of the servo controller 0106 shown in FIG. 2 supplies the clock signal Clk1 of the same frequency f1 to the waveform data output unit 0201, the logic signal output unit 0202 and the status information output unit 0203, but may supply clock signals respectively different in frequency thereto.

The waveform data output unit 0201 of the servo controller 0106 takes in multi-valued digital data Se used as the servo error calculation signal in the servo controller 0106 in sync with the servo clock signal Clk1 and thereby supplies the waveform data A001*a* to the servo monitor signal processor 0302. A focus error signal FE, a tracking error signal TE, a lens error signal LE indicative of a displacement of an objective lens lying inside the pickup unit 104, a signal whose amplitude has been normalized, corresponding to a signal being in the course of being calculated, a signal indicative of a result of filter calculations by a low pass filter (LPF) and a band pass filter (BPF), etc. are contained in the waveform data A001*a* or the servo error calculation signal. The waveform data output unit 0201 is capable of selecting and outputting a plurality of types of waveform data A001*a*, based on the control from the system controller 0111. For example, when the focus error signal FE, the tracking error signal TE and the lens error signal LE used as the waveform data A001*a* are outputted from the waveform data output unit 0201, the waveform data output unit 0201 selects and takes in any of the focus error signal FE, the tracking error signal TE and the lens error signal LE from the multi-valued digital data in the servo controller 0106, based on the control from the system controller 0111 and supplies the same to the servo monitor signal processor 0302 of the buffer controller 0108.

The logic signal output unit 0202 takes in binarized digital data used as the servo calculation control signal Sc in the servo controller 0106 in synchronism with the servo clock signal Clk1 and thereby supplies it to the servo monitor signal processor 0302 of the buffer controller 0108 as the logic signal A001*b*. A focus pull-in state detection signal FOK and a track pull-in state detection signal TOH, etc. are contained in the logic signal A001*b* or the servo calculation control signal Sc. In a manner similar to the waveform data output unit 0201, the logic signal output unit 0202 is also able to select and output a plurality of types of the logic signals A001*b*, based on the control from the system controller 0111.

The status information output unit 0203 takes in the operation status signal So indicative of he internal operating state of the servo controller 0106 in sync with the servo clock signal Clk1 and thereby supplies it to the servo monitor signal processor 0302 of the buffer controller 0108 as the status information A001*c*. In a manner similar to the waveform data output unit 0201, the status information output unit 0203 is also able to select and output a plurality of types of the status information A001*c*, based on the control from the system controller 0111. Incidentally, the operation status signal So is, for example, a signal indicative of a load state/non-load state of the disk while the optical disk 0101 is at rest, and is a signal indicative of a seek state and a tracking state while the optical disk 0101 is in rotation.

Incidentally, although in the servo controller 0106 shown in FIG. 2, the waveform data output unit 0201, the logic signal output unit 0202 and the status information output unit 0203 are respectively able to select and output a plurality of types of output signals, the numbers of output data at the respective output units may be changed as needed. Alternatively, any of the output units may output only a single output.

In the buffer controller 0108, the sampling controller 0303 is comprised of a multiplying circuit, a division circuit and the like. The sampling controller 0303 executes a multiplying process of the system clock signal A004*b* outputted from the system clock generator 0114 and a dividing process thereof, based on the control of the system controller 0111 to thereby generate a sampling clock signal Clk2 having a frequency f2, a sampling clock signal Clk3 having a frequency f3, a sampling clock signal Clk4 having a frequency f4 and a sampling clock signal Clk5 having a frequency f5 and supplies the sampling clock signal Clk2 to the read data processor 0301, the sampling clock signal Clk3 to the servo monitor signal processor 0302, and the sampling clock signal CLk4 and the sampling clock signal Clk5 to the memory access controller 0304, respectively.

Incidentally, the servo clock generator 0204 of the servo controller 0106 and the sampling controller 0303 of the buffer controller 0108 are respectively operated based on the system clock signals A004*a* and A004*b* outputted from the system clock generator 0114 of the optical disk drive 0001. Therefore, when the sampling controller 0303 and the servo clock generator 0204 are brought into synchronization, the control from the system controller 0111 and the system clock signals A004*a* and A004*b* can be utilized.

The read data processor 0301 of the buffer controller 0108 takes in the read data A002 in sync with the sampling clock signal Clk2 supplied from the sampling controller 0303, based on the control of the system controller 0111 and thereby executes buffering of the read data A002. Also, the read data processor 0301 generates burst data for the read data A002, based on the control of the system controller 0111 and outputs it as the processed read data A101.

The servo monitor signal processor 0302 of the buffer controller 0108 takes in the waveform data A001*a*, logic signal A001*b* and status information A001*c* supplied from the servo controller 0106, and the buffer control status signal A104 supplied from the memory access controller 0304 in sync with the sampling clock signal Clk3. The buffer control status signal A104 is a signal for notifying the operating state of the memory access controller 0304 to the outside of the optical disk drive 0001. Also, the servo monitor signal processor 0302 generates, as the processed servo monitor signal A102, any of the waveform data A001*a*, logic signal A001*b*, status information A001*c* and buffer control status signal A104 taken therein, based on settings from the system controller 0111 and outputs the same therefrom. Namely, the processed servo monitor signal A102 is data generated by being selected as data to be stored in the buffer memory unit 0109 out of the taken-in waveform data A001*a*, logic signal A001*b*, status information A001*c* and buffer control status signal A104 and being subjected to a conversion process as store data.

The memory access controller 0304 of the buffer controller 0108 executes a reproduction signal output process for supplying the processed read data A101 from the read data processor 0301 and the processed servo monitor signal A102 from the servo monitor signal processor 0302 to the external I/F unit 0110. On the other hand, the memory access controller 0304 executes a recording signal input process for supplying the user data supplied from the external I/F unit 0110 to the read/write processor 0107. Upon the reproduction signal output process, the memory access controller 0304 executes a process (hereinafter called "store process 1") for storing the processed read data A101 and processed servo monitor signal A102 supplied thereto in the buffer memory unit 0109, and a process (hereinafter called "load process 1") for loading the processed read data A101 and processed servo monitor signal A102 stored in the buffer memory unit 0109 and supplying the same to the external I/F unit 0110.

Upon the operation of the store process 1, the memory access controller 0304 selects data to be stored in the buffer memory unit 0109 from the processed read data A101 and processed servo monitor signal A102 supplied thereto, based on the control of the system controller 0111. Also, the memory access controller 0304 takes in the processed read data A101 in sync with the sampling clock signal Clk4 and takes in the processed servo monitor signal A102 in sync with the sampling clock signal Clk5, and stores the taken-in data in the buffer memory unit 0109 through the memory bus B001.

Upon the operation of the load process 1, the memory access controller 0304 loads the processed read data A101 and processed servo monitor signal A102 stored in the buffer memory unit 0109, based on the control of the system controller 0111 and supplies the same to the input/output data bus B002. The data supplied from the memory access controller 0304 to the input/output data bus B002 is supplied to the external I/F unit 0110.

Upon the recording signal input process, the memory access controller 0304 executes a process (hereinafter called "store process 2") for storing the user data supplied from the external I/F unit 0110 in the buffer memory unit 0109, and a process (hereinafter called "load process 2") for loading the user data stored in the buffer memory unit 0109 and outputting the same to the read/write processor 0107.

Upon the operation of the store process 2, the memory access controller 0304 stores the user data supplied from the external I/F unit 0110 via the input/output data bus B002 in the buffer memory unit 0109 through the memory bus B001, based on the control of the system controller 0111.

Upon the operation of the load process 2, the memory access controller 0304 loads the user data stored in the buffer memory unit 0109, based on the control of the system controller 0111 and supplies the same to the read/write processor 0107.

The memory access controller 0304 also executes a process for supplying the buffer control status signal A104 to the servo monitor signal processor 0302. A discontinuous flag, a trigger generation flag, etc. to be described later are contained in the buffer control status signal A104. Further, in order to perform the above-described access control on the buffer memory unit 0109, the memory access controller 0304 is also able to have a memory access arbitrating function. As examples illustrative of this memory access arbitration, there are mentioned simultaneous occurrence of access for an error correction process by the read data processor 0301 to the buffer memory unit 0109 via the memory access controller 0304, and a request for the supply of the buffer control status signal A104 from the memory access controller 0304 to the servo monitor signal processor 0302, etc.

On the other hand, the ring buffer controller 0305 executes control for operating the buffer memory unit 0109 as a ring buffer as will be described later.

In the optical disk drive 0001 according to the first embodiment of the present invention shown in FIGS. 1 and 2, a data transfer rate DRATE1 at the time that the memory access controller 0304 takes in the processed read data A101, is set so as to become a transfer rate higher than a data transfer rate DRATE2 at the time that the read data processor 0301 takes in the read data A002. A data transfer rate DRATE3 at the time that the memory access controller 0304 takes in the processed servo monitor signal A102, is set so as to be a transfer rate higher than a data transfer rate DRATE4 at the time that the servo monitor signal processor 0302 takes in the servo monitor signal A001.

In the optical disk drive 0001 according to the first embodiment of the present invention shown in FIGS. 1 and 2, the memory access controller 0304 is able to select either of the processed read data A101 and the processed servo monitor signal A102 and store the same in the buffer memory unit 0109. In each of the read data processor 0301 and the servo monitor signal processor 0302 of the optical disk drive 0001 according to the first embodiment of the present invention, a per-unit time rate of transfer of output data to the memory access controller 0304 is set higher than an input data transfer rate per unit time, thereby making it possible to store data about both the processed read data A101 and the processed servo monitor signal A102 in the buffer memory unit 0109 on a time-division basis.

Since the waveform data output unit 0201, the logic signal output unit 0202 and the status information output unit 0203 included in the servo controller 0106 are respectively capable of selecting and outputting the plurality of types of data, the plurality of types of waveform data A001*a*, logic signals A001*b* and status information A001*c* substantially at the same time can be stored in the buffer memory unit 0109 approximately simultaneously.

<<Servo Monitor Signal Processor>>

Figure 3:
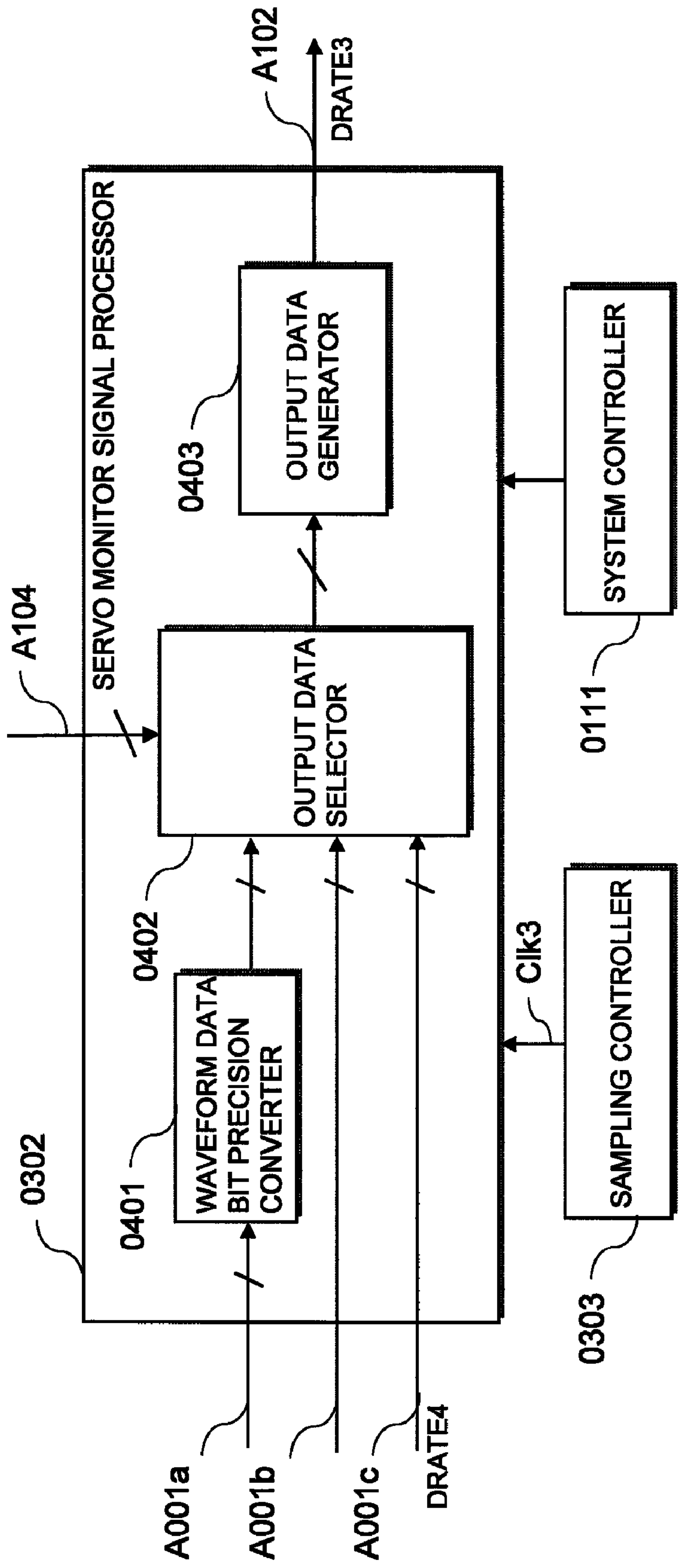
FIG. 3 is a diagram depicting a configuration of a servo monitor signal processor 0302 shown in FIG. 2 included in the buffer controller 0108 of the optical disk drive 0001 according to the first embodiment of the present invention shown in FIG. 1.

FIG. 3 is a diagram showing a configuration of the servo monitor signal processor 0302 shown in FIG. 2 included in the buffer controller 0108 of the optical disk drive 0001 according to the first embodiment of the present invention shown in FIG. 1.

The servo monitor signal processor 0302 shown in FIG. 3 comprises a waveform data bit precision converter 0401, an output data selector 0402 and an output data generator 0403.

On the other hand, in the optical disk drive 0001 according to the first embodiment of the present invention shown in FIGS. 1 and 2, the servo controller 0106 uses multi-valued digital data of 24-bit precision upon its internal arithmetic operation. The waveform data output unit 0201 extracts or pulls out upper 16 bits out of the multi-valued digital data of the 24-bit precision and outputs the same as the waveform data A001*a*. The waveform data A001*a* is not limited to the upper 16 bits, but may be set to upper 8 bits, upper 4 bits or the like. Further, the bit position of data to be extracted can also be set to an arbitrary position of 24 bits.

In the servo monitor signal processor 0302 shown in FIG. 3, the waveform data bit precision converter 0401 extracts from upper bits, the number of bits designated from the waveform data A001*a* of 16 bits supplied based on the settings of the system controller 0111 and supplies the same to the output data selector 0402 as bit precision conversion waveform data. When a plurality of types of waveform data A001*a* are supplied to the waveform data bit precision converter 0401, the above bit extracting process is executed on the respective waveform data A001*a*, based on the separately designated number of bits. Incidentally, although the number of bits is extracted from the upper bits of the waveform data A001*a* in the servo monitor signal processor 0302 shown in FIG. 3, the number of bits may be extracted from any arbitrary bit position.

The output data selector 0402 of the servo monitor signal processor 0302 shown in FIG. 3 takes in the bit precision conversion waveform data supplied from the waveform data bit precision converter 0401, the logic signal A001*b* supplied from the logic signal output unit 0202, the status information A001*c* supplied from the status information output unit 0203 and the buffer control status signal A104 supplied from the memory access controller 0304 in sync with the sampling clock Clk3, based on the settings of the system controller 0111, and selects and outputs data designated by the system controller 0111 from the taken-in data.

The output data generator 0403 of the servo monitor signal processor 0302 shown in FIG. 3 generates and outputs a processed servo monitor signal A102 from the data selected by the output data selector 0402 on the basis of an output data format designated by the system controller 0111. Here, the output data format of the processed servo monitor signal A102 is used to arbitrarily set a data size which is suitable for a bus width of the memory bus B001 and is stored in the buffer memory unit 0109.

Figure 4:
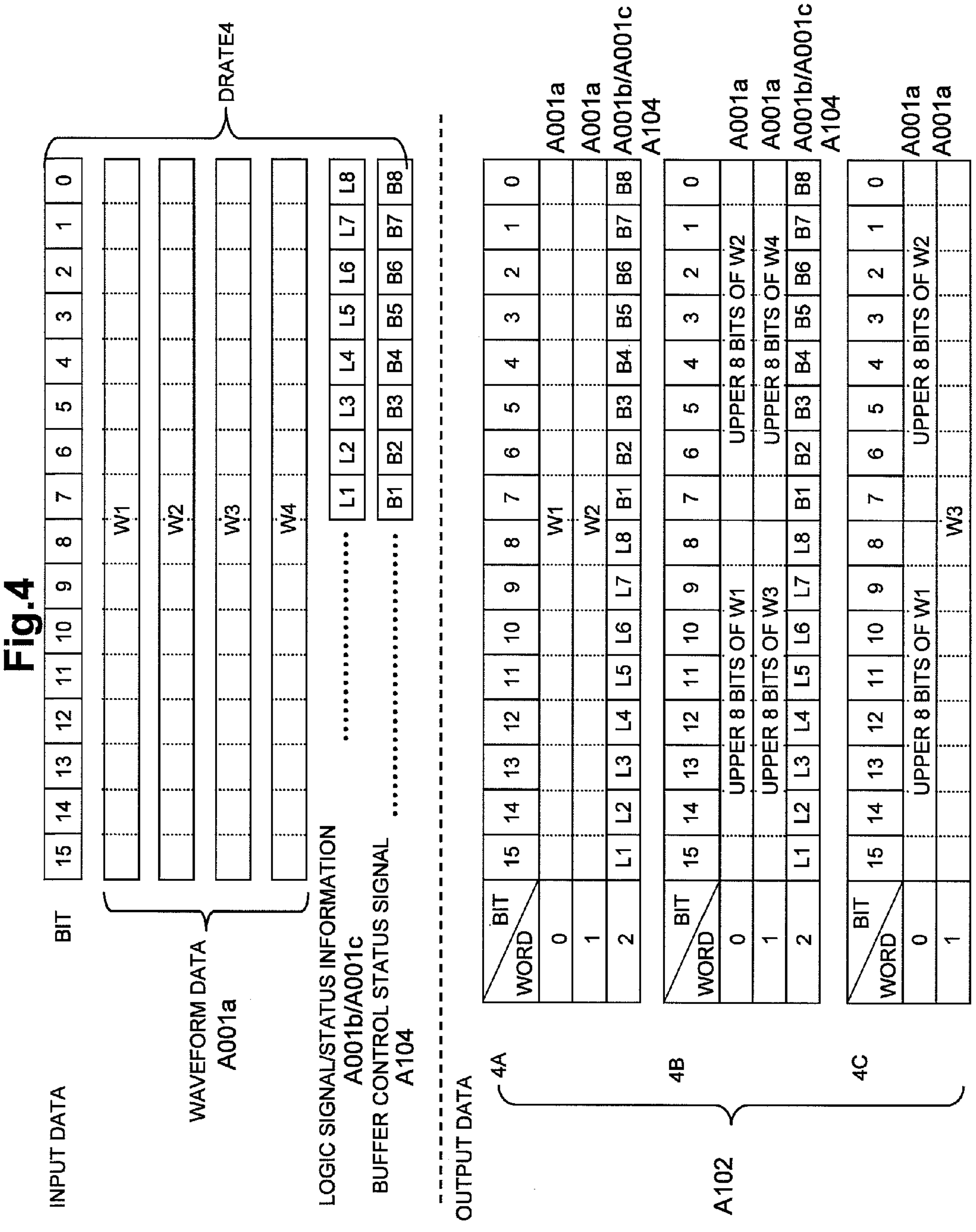
FIG. 4 is a diagram showing one example illustrative of formats of input data supplied to the servo monitor signal processor 0302 of the optical disk drive 0001 according to the first embodiment of the present invention shown in FIGS. 1, 2 and 3 and output data of a processed servo monitor signal A102 outputted from the servo monitor signal processor 0302.

FIG. 4 is a diagram showing one example illustrative of formats of input data supplied to the servo monitor signal processor 0302 of the optical disk drive 0001 according to the first embodiment of the present invention shown in FIGS. 1, 2 and 3, and output data about the processed servo monitor signal A102 outputted from the servo monitor signal processor 0302 thereof.

FIG. 4 illustrates, as one example, where as combinations of the input data supplied to the servo monitor signal processor 0302, waveform data A001*a* of 16 bits are set to four (W1 through W4), logic signals A001*b* of respective one bits and status information A001*c* of respective one bits are brought together to be set to eight (L1 through L8), and buffer control status signals of respective one bits are brought together to be set to eight (B1 through B8). In FIG. 4, 4A indicates a first output data format, 4B indicates a second output data format, and 4C indicates a third output data format.

The format shown in 4A is an example wherein as the contents of the outputted processed servo monitor signal A102, waveform data A001*a* of 16 bits are set to two (W1 and W2), logic signals A001*b* and status information A001*c* are brought together to be set to eight (L1 through L8), and buffer control status signals A104 are set to eight (B1 through B8), respectively, so that a data format size of output data A102 is set to 48 bits corresponding to 16 bits×3 in total.

The format shown in 4B is an example in which as the contents of the outputted processed servo monitor signal A102, waveform data A001*a* of 8 bits are set to four (respective upper 8 bits of W1 through W4), logic signals A001*b* and status information A001*c* are brought together to be set to eight (L1 through L8), and buffer control status signals A104 are set to eight (B1 through B8), respectively, so that a data format size of output data A102 is set to 48 bits corresponding to 16 bits×3 in total.

The format shown in FIG. 4C is an example in which as the contents of the outputted processed servo monitor signal A102, waveform data A001*a* of 8 bits are set to two (respective upper 8 bits of W1 and W2), and waveform data A001*a* of 16 bits is set to one (W3), respectively, so that a data format size of output data A102 is set to 32 bits corresponding to 16 bits×2 in total.

Even at other than the examples illustrative of the format of the output data about the processed servo monitor signal A102 shown in FIG. 4, it is possible to optionally select the combination of data at the format of the output data about the processed servo monitor signal A102, like the output of only logic signals A001*b*, the output of only status information A001*c* or the output of only buffer control status signals A104, and so on. As to the data size of the output data format, it may be set not only to 48 bits and 32 bits referred to above, but also to an arbitrary number of bits in consideration of the width of the memory bus B001.

In the optical disk drive 0001 according to the first embodiment of the present invention shown in FIGS. 1, 2 and 3, it is possible to arbitrarily set the bit precision of the waveform data A001*a* when the servo monitor signal processor 0302 selects the data to be stored in the buffer memory unit 0109 from the waveform data A001*a*, logic signals A001*b*, status information A001*c* and buffer control status signals A104 supplied thereto and converts the selected data into the designated format of output data. Consequently, the type of the waveform data A001*a* stored in the buffer memory unit 0109 and the number thereof can be changed. When the servo monitor signal processor 0302 stores a plurality of waveform data in the buffer memory unit 0109, the bit precision can be set for each waveform data. Therefore, when the analysis of the operation of the optical disk drive 0001 is carried out, the bit precision of waveform data high in importance and observed in detail can be set high, whereas the bit precision of waveform data relatively low in importance but observed approximately simultaneously with other waveform data can be set low. Thus, the size of data stored in the buffer memory unit 0109 can be reduced by cutting down the size of waveform data relatively low in importance.

With the buffer control status signals A104 for notifying the operating state of the memory access controller 0304 being included in the processed servo monitor signal A102, it is possible to observe the servo monitor signal A001 in consideration of the operating state of the buffer controller 0108 when the processed servo monitor signal A102 supplied to the PC 0002 provided outside the optical disk drive 0001 is observed. The data size of the format of the output data about the processed servo monitor signal A102 can arbitrarily be set, whereby it is possible to set the memory capacity necessary when the memory access controller 0304 stores the processed servo monitor signal A102 in the buffer memory unit 0109, and the data transfer rate per unit time.

Figure 5:
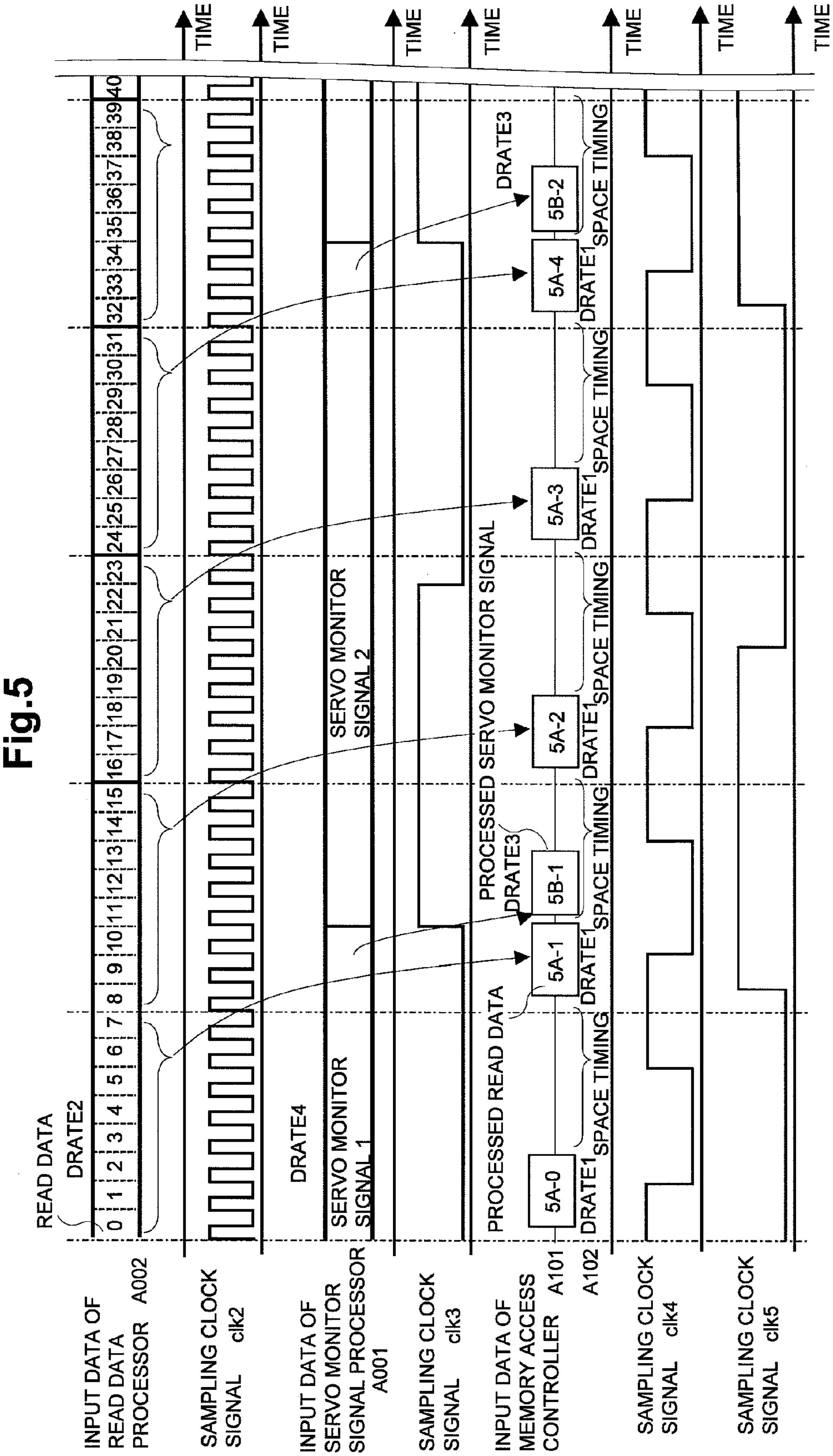
FIG. 5 is a diagram illustrating the waveforms of input and output data of a read data processor 0301, the servo monitor signal processor 0302 and a memory access controller 0304 in the optical disk drive 0001 according to the first embodiment of the present invention shown in FIGS. 1, 2 and 3.

FIG. 5 is a diagram showing the waveforms of input and output data of the read data processor 0301, the servo monitor signal processor 0302 and the memory access controller 0304 in the optical disk drive 0001 according to the first embodiment of the present invention shown in FIGS. 1, 2 and 3.

In the waveforms illustrated in FIG. 5, the frequency f2 of the sampling clock signal Clk2 used as the frequency at which the read data processor 0301 takes in read data A002, is set higher than the frequency f3 of the sampling clock signal Clk3 used as the frequency at which the servo monitor signal processor 0302 takes in the servo monitor signal A001. In the waveforms shown in FIG. 5 as well, the frequency with which the memory access controller 0304 takes in processed read data A101 (5A-0 through 5A-4), is set higher than the frequency with which the memory access controller 0304 takes in the processed servo monitor signal A102 (5B-1 through 5B-2). Further, in the waveforms shown in FIG. 5, the read data processor 0301 generates one processed read data A101 by buffering eight read data A002. On the other hand, the servo monitor signal processor 0302 generates one processed servo monitor signal A102 from one servo monitor signal A001.

In the first embodiment of the present invention shown in FIGS. 1 through 5, the data transfer rate DRATE1 at the time that the memory access controller 0304 takes in the processed read data A101, can be set to the transfer rate higher than the data transfer rate DRATE2 at the time that the read data processor 0301 takes in the read data A002. The data transfer rate DRATE3 at the time that the memory access controller 0304 takes in the processed servo monitor signal A102, can be set to the transfer rate higher than the data transfer rate DRATE4 at the time that the servo monitor signal processor 0302 takes in the servo monitor signal A001.

The memory access controller 0304 takes in the read data A002 (1 . . . 8) fetched in the read data processor 0301 at the data transfer rate DRATE2 in sync with the sampling clock signal Clk2, as the processed read data A101 (5A-1) at the data transfer rate DRATE1 in synch with the falling edge of the sampling clock signal Clk4. Likewise, the processed read data A101 (5A-2, 5A-3, 5A-4 and 5A-5) are also fetched in the memory access controller 0304 at the data transfer rate DRATE1.

The memory access controller 0304 takes in the servo monitor signal A001 (1) fetched in the servo monitor signal processor 0302 at the data transfer rate DRATE4 in sync with the sampling clock signal Clk3, as the processed servo monitor signal A102 (5B-1), at the data transfer rate DRATE3 in synch with the sampling clock signal Clk5. Likewise, the processed servo monitor signal A102 (5B-2) is also fetched in the memory access controller 0304 at the data transfer rate DRATE3.

Thus, with the fetching of the processed read data A101 in the memory access controller 0304 at the transfer rate DRAE1 set to the transfer rate higher than the data transfer rate DRATE2, allowance is given to the data input/output throughput capacity of the memory access controller 0304 so that such space timings as shown in FIG. 5 are generated. Thus, the memory access controller 0304 is capable of taking in the processed read data A101 and the processed servo monitor signal A102 on a time-division basis by executing the fetching of the processed servo monitor signal A102 therein during each space timing shown in FIG. 5. Hence the memory access controller 0304 is able to store both data in the buffer memory unit 0109.

Thus, when the memory access controller 0304 takes in the processed read data A101 and the processed servo monitor signal A102 on the time-division basis, the sampling clock controller 0303 outputs the sampling clock signal Clk4 for allowing the memory access controller 0304 to take in the processed read data A101, and the sampling clock signal Clk5 for allowing the memory access controller 0304 to take in the processed servo monitor signal A102, based on the control of the system controller 0111. Incidentally, the memory access controller 0304 is also able to generate the sampling clock signal Clk5 from the sampling clock signal Clk4.

Incidentally, the waveforms shown in FIG. 5 are illustrated by way of example. It is possible to arbitrarily set the data transfer rate DRATE4 of the servo monitor signal processor 0302 provided in the buffer controller 0108 and the data transfer rates DRATE1 and DRATE3 of the memory access controller 0304 provided therein.

Figure 6:
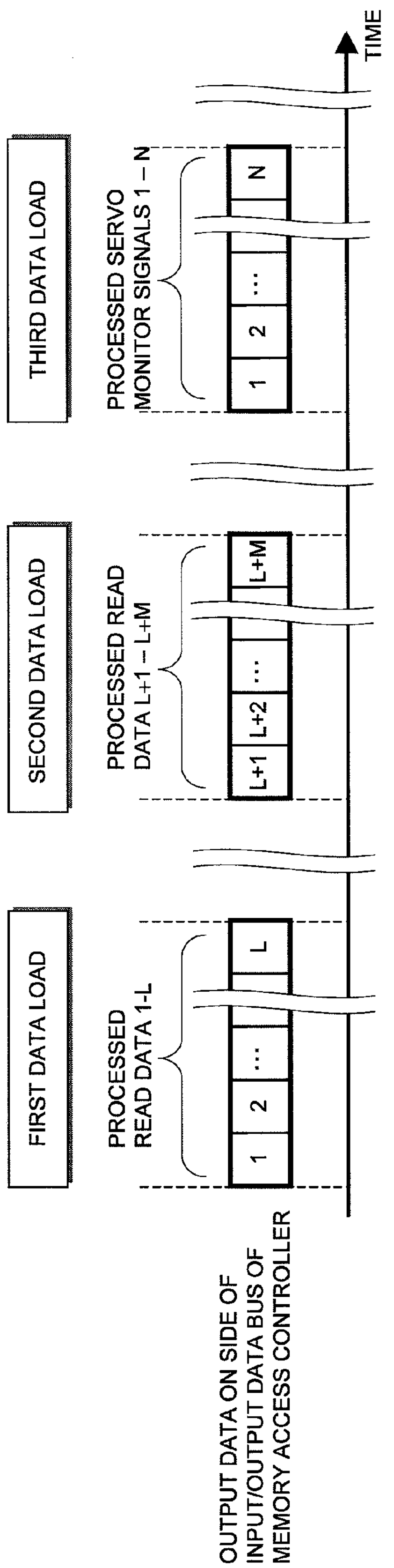
FIG. 6 is a diagram showing waveforms taken when the memory access controller 0304 loads data into an external I/F unit 0110 in the optical disk drive 0001 according to the first embodiment of the present invention shown in FIGS. 1 through 5.

FIG. 6 is a diagram showing waveforms taken when the memory access controller 0304 loads data into the external I/F unit 0110 in the optical disk drive 0001 according to the first embodiment of the present invention shown in FIGS. 1 through 5.

FIG. 6 shows a state in which when the memory access controller 0304 loads the stored data of the buffer memory unit 0109 onto the input/output data bus B002, the memory access controller 0304 continuously loads L processed read data A101 at the first data load, continuously loads M processed read data A101 at the second data load, and continuously loads N processed servo monitor signals A102 at the third data load.

When the processed read data A101 are transferred to the PC 0002 provided outside the optical disk drive 0001, the memory access controller 0304 loads the processed read data A101 from the buffer memory unit 0109, based on a data transfer instruction supplied from the external PC 0002 via the external I/F unit 0110 and transfers the same to the external PC 0002 through the external I/F unit 01110. Upon the process of transferring the processed servo monitor signal A102 to the PC 0002 provided outside the optical disk drive 0001, data transfer instructions or the like sent from the external I/F unit 0110 and the external PC 0002, corresponding to firmware used upon the process of transfer of the processed read data A101, can be used.

Further, the memory access controller 0304 outputs the processed read data A101 and processed servo monitor signals A102 stored in the buffer memory unit 0109 to the input/output data bus B002 on a time-division basis, based on the control of the system controller 0111 and transfers the outputted data to the external PC 0002 via the external I/F unit 0110.

The memory access controller 0304 has the function of transferring the processed read data A101 to the external PC 0002, the function of transferring the processed servo monitor signals to the external PC 0002, and the function of outputting the processed read data A101 and the processed servo monitor signal A102 to the input/output data bus B002 on the time-division basis. As a result, it is not necessary to additionally provide hardware for transferring the processed servo monitor signals A102 to the external PC 0002. Further, it is possible to transfer both data of the processed read data A101 and the processed servo monitor signals A102 to the external PC 0002.

Figure 7:
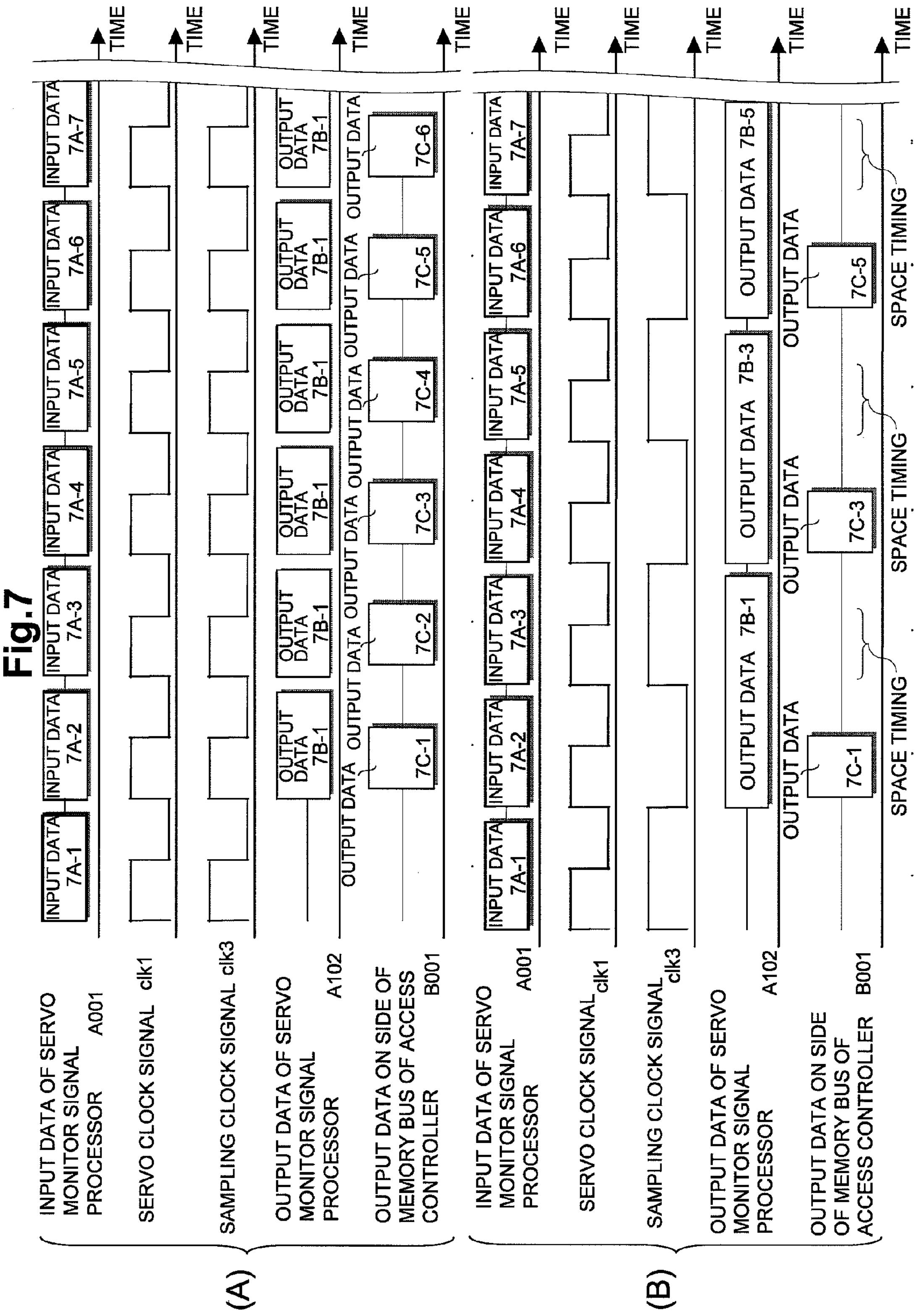
FIG. 7 is a diagram depicting waveforms of input and output data of the servo monitor signal processor 0302 and the memory access controller 0304 in the optical disk drive 0001 according to the first embodiment of the present invention shown in FIGS. 1 through 5.

FIG. 7 is a diagram showing waveforms of input and output data of the servo monitor signal processor 0302 and the memory access controller 0304 in the optical disk drive 0001 according to the first embodiment of the present invention shown in FIGS. 1 through 5.

A description will be given to the case where only a servo monitor signal A001 is stored in the buffer memory unit 0109 for simplification of explanation in the waveforms shown in FIG. 7. The waveform (A) of FIG. 7 shows where the frequency f3 of a sampling clock signal Clk3 and the frequency f1 of a servo clock signal Clk1 are equal to each other. The waveform (B) of FIG. 7 shows where the frequency f3 of a sampling clock signal Clk3 is a frequency produced by dividing the frequency f1 of the servo clock signal Clk1 by two.

In the case of the waveform (A) of FIG. 7, the frequency f3 of the clock signal Clk3 is equal to the frequency f1 of the clock signal Clk1. Therefore, a sampling number per unit time, of processed servo monitor signals A102 generated by the servo monitor signal processor 0302 becomes equal to a sampling number per unit time at the servo controller 0106, of servo monitor signals A001 each comprised of waveform data A001*a*, a logic signal A001*b* and status information A001*c* to be supplied. In this case, the servo monitor signal A001 inputted from the servo controller 0106 is supplied to the memory access controller 0304 as the processed servo monitor signal A102 without being thinned out and sampled by the servo monitor signal processor 0302.

Since the frequency f3 of the clock signal Clk3 is the frequency produced by dividing the frequency f1 of the clock signal Clk1 by two in the case of the waveform (B) of FIG. 7, a sampling number per unit time, of processed servo monitor signals A102 outputted by the servo monitor signal processor 0302 becomes half the sampling umber per unit time at the servo controller 0106, of the servo monitor signals A001 each comprised of the waveform data A001*a*, logic signal A001*b* and status information A001*c* supplied thereto. Namely, the servo monitor signal A001 inputted from the servo controller 0106 is thinned out and sampled by the servo monitor signal processor 0302 and supplied to the memory access controller 0304 as the processed servo monitor signal A102. Thus, in the case of the waveform (B), the frequency with which the memory access controller 0304 takes in the processed servo monitor signals A102, reaches half the frequency in the case of the waveform (A).

In the waveform (B) of FIG. 7, the thinning process for taking in the processed servo monitor signal A102 by setting the frequency f3 of the sampling clock signal Clk3 lower than the frequency f1 of the clock signal Clk1 is realized. It is also however possible to change the setting of the frequency of each of the clock signal Clk1 and the sampling clock signal Clk5 in addition to the sampling clock signal Clk3. At this time, a division ratio may also be arbitrarily set and changed for the purpose of the change in setting. When the servo monitor signal processor 0302 thins out the servo monitor signal A001 and executes sampling thereof, the servo monitor signal processor 0302 may also execute the thinning out of the buffer control status signal A104 simultaneously.

By setting the frequency f3 of the sampling clock signal Clk3 lower than the frequency f1 of the servo clock signal Clk1 in this way, space timings shown in the waveform (B) of FIG. 7 can be made where the memory access controller 0304 takes in the processed servo monitor signals A102. Thus, the memory access controller 0304 is able to use the space timings in the execution of other processing.

With the setting of the frequency f3 of the sampling clock signal Clk3 lower than the frequency f1 of the servo clock signal Clk1, the sampling number per unit time, of the processed servo monitor signal A102 stored in the buffer memory unit 0109 is reduced to enable a reduction in the amount of data. It is therefore possible to reduce the memory capacity of each processed servo monitor signal store area lying inside the buffer memory unit 0109.

FIG. 8 is a diagram showing changes in memory address when discontinuity occurs in data stored in the buffer memory unit 0109 in the optical disk drive 0001 according to the first embodiment of the present invention shown in FIGS. 1 through 5.

The memory access controller 0304 included in the buffer controller 0108 takes in each processed servo monitor signal A102 supplied from the servo monitor signal processor 0302 in sync with the sampling clock signal Clk5 and stores the same in the buffer memory unit 0109. At this time, in the case where processing higher in priority than the storing of the processed servo monitor signal A102 in the buffer memory unit 0109 at the inner processing of the memory access controller 0304, and the like, the interruption of the process of storing the processed servo monitor signal A102 in the buffer memory unit 0109 takes place.

FIG. 8 shows, as one example, the case where the memory access controller 0304 stores only the processed servo monitor signals A102 in the buffer memory unit 0109 and further, the frequency f3 of the sampling clock signal Clk3 of the servo monitor signal processor 0302 and the frequency f5 of the sampling clock signal Clk5 for sampling the processed servo monitor signal A102 of the memory access controller 0304 are equal to each other.

A waveform (A) of FIG. 8 indicates waveform data A001 contained in the corresponding processed servo monitor signal A102 supplied to the memory access controller 0304. A waveform (B) of FIG. 8 indicates the manner in which waveform data A001*a* contained in the corresponding processed servo monitor signal A102 are stored in the buffer memory unit 0109 via the memory bus B001 by the memory access controller 0304. A waveform (C) of FIG. 8 indicates waveform data A001*a* contained in the corresponding processed servo monitor signal A102 stored in the buffer memory unit 0109.

When the process of storing data d9 to d14 of the processed servo monitor signal A102 is interrupted as shown in the waveform (B) of FIG. 8, for example, waveform data A001*a* contained in the processed servo monitor signal A102 stored in the buffer memory unit 0109 are stored like data in which data d8 lying immediately before a store interrupt period and data d15 lying immediately after the store interrupt period are continuous seemingly. Thus, there is a possibility that when an observer observes the waveform data A001*a* stored in the buffer memory unit 0109, the observer will determine it as continuous data erroneously.

Thus, in the optical disk drive 0001 according to the first embodiment of the present invention shown in FIGS. 1 through 5, a flag bit (hereinafter called "discontinuous flag") indicative of the occurrence of discontinuity is located in one bit of the buffer control status signal A104. The discontinuous flag is set to an initial value "0". The discontinuous flag is maintained at the initial value "0" during a period in which the memory access controller 0304 is executing the process of storing data in the buffer memory unit 0109. When, however, the interruption of the data store process takes place, the memory access controller 0304 changes the discontinuous flag to "1" immediately after the resumption of the data store process to thereby execute a data store process for each processed servo monitor signal A102 added with a discontinuous bit "1" firstly immediately after the resumption of the data store process. Thereafter, the discontinuous bit is cleared from "1" to the initial value "0".

With the location of the above discontinuous flag in one bit of the buffer control status signal A104 being one type of the data format of the processed servo monitor signal A102 in this way, it is possible to determine that discontinuity has occurred between data at the timing at which the discontinuous flag is brought to "1" and data lying immediately before the data, by referring to the discontinuous flag shown in the waveform (C) of FIG. 8 where the discontinuity has occurred in the data stored in the buffer memory unit 0109. As a result, when the observer observes the data stored in the buffer memory unit 0109, it is possible to prevent the observer from misjudging the data as continuous data.

<<Buffer Memory>>

FIG. 9 is a diagram showing one example of setting addresses in a processed servo monitor signal store area lying inside the buffer memory unit 0109 in the optical disk drive 0001 according to the first embodiment of the present invention shown in FIGS. 1 through 8. In FIG. 9, the memory capacity of the buffer memory unit 0109 is assumed to be 1000 hbytes as one example.

The memory access controller 0304 ensures a processed servo monitor signal store area designated by a start address ADRS1 and an end address ADRS2 inside the buffer memory unit 0109, based on the settings from the system controller 0111. The memory access controller 0304 sets inside the processed servo monitor signal store area ensured therein, a read pointer RADRS indicative of an address for data to be loaded, and a write pointer WADRS indicative of an address for data to be stored. As shown in FIG. 9, the processed servo monitor signal store area can be ensured in an area different from a processed read data store area corresponding to an area for storing processed read data A101.

In FIG. 9, the initial value of the read pointer RADRS and the initial value of the write pointer WADRS are set to the start address ADRS1 in an initial state. If, however, the value of the read pointer RADRS is the same as the value of the write pointer WADRS, then they can be set to an arbitrary initial address without being set to the start address ADRS1. The state of storage of the buffer memory unit 0109 shown in FIG. 9 indicates a state in which data is storing in a memory range from the read pointer RADRS to the write pointer WADRS.

In FIG. 9, a data stored area 0501 indicates an area in which a processed servo monitor signal A102 is stored. A data non-stored area 0502 indicates an area in which the processed servo monitor signal A102 is not yet stored.

In the optical disk drive 0001 according to the first embodiment of the present invention shown in FIGS. 1 through 9, the partial memory area of the buffer memory unit 0109, which is used as a memory lying inside the disk drive, is used as a store memory for the processed servo monitor signal A102. As a result, it is possible to suppress an increase in cost because there is no need to add other buffer memories. As the store memory for the processed servo monitor signal A102, part of a program storage memory not shown in FIG. 9 may be used.

FIG. 10 is a diagram showing the manner in which the buffer memory unit 0109 is configured as a ring buffer in the optical disk drive 0001 according to the first embodiment of the present invention shown in FIGS. 1 through 9.

The buffer memory unit 0109 configured as the ring buffer in FIG. 10 is used as the processed servo monitor signal store area described in FIG. 9.

Namely, as shown in FIG. 10, the processed servo monitor signal store area lying inside the buffer memory unit 0109 is configured as the ring buffer. A read pointer RADRS and a write pointer WADRS are set so as to return to the value of a start address ADRS1 when they reach the value of the end address ADRS2 shown in FIG. 9.

The ring buffer controller 0305 included in the memory access controller 0304 shown in FIG. 2 controls the read pointer RADRS and the write pointer WADRS in such a manner that the overwriting of load data inside a data stored area 0501 due to the write pointer WADRS outpacing the read pointer RADRS does not occur and the loading of undefined-value data inside a data non-stored area 0502 due to the read pointer RADRS outpacing the write pointer WADRS does not occur, thereby executing storing and loading of suitable data.

An operation process taken where a possibility that the write pointer WADRS will outpace the read pointer RADRS has occurred, and an operation process taken where a possibility that the read pointer RADRS will outpace the write pointer WADRS has occurred, can be associated with each other by allowing the system controller 0111 to perform a setting on the ring buffer controller 0305. For example, when the read pointer RADRS has caught up with the write pointer WADRS, only the read pointer RADRS is stopped. As a result, the value of the read pointer RADRS stop, whereas the value of the write pointer WADRS increases. For example, the ring buffer controller 0305 performs control of the buffer memory unit 0109 in such a manner as to resume the increment of the read pointer RADRS when the difference between address values of the read pointer RADRS and the write pointer WADRS reaches a value corresponding to one-half the processed servo monitor signal store area. Executing the above operations by the ring buffer controller 0305 enables the implementation of a reliable process of storing the processed servo monitor signal A102 in the buffer memory unit 0109 configured as the ring buffer and its reliable load process.

Namely, the buffer memory unit 0109 is configured as the ring buffer. On the other hand, the ring buffer controller 0305 performs the control shown above on the read pointer RADRS and the write pointer WADRS. Thus, when the processed servo monitor signal A102 is stored, there is no need to take into consideration exhaustion of the memory capacity of the buffer memory unit 0109. It is possible to implement a reliable store process of data continuous in time and its reliable load process.

<<Setting of Servo Observation Parameters>>

FIG. 11 is a diagram showing setting processes and parameters for observing each servo monitor signal A001 in the optical disk drive 0001 according to the first embodiment of the present invention shown in FIGS. 1 through 10.

In the process of a buffer memory setting in FIG. 11, the setting of a start address ADRS1 and an end address ADRS2 corresponding to setting parameters is executed to ensure a store area for each processed servo monitor signal inside the buffer memory unit 0109.

In the process of a servo monitor signal setting in FIG. 11, the setting of the type of servo monitor signal and the number of servo monitor signals both corresponding to setting parameters for designating the type and number of data outputted as processed servo monitor signals A102, of waveform data A001*a*, logic signals A001*b* and status information A001*c* supplied to the servo monitor signal processor 0302 from the waveform data output unit 0201, logic signal output unit 0202 and status information output unit 0203 included in the servo controller 0106 is executed. The setting of waveform data bit precision corresponding to a setting parameter for designating the bit precision of waveform data A001*a* from the waveform data output unit 0201 to the servo monitor signal processor 0302 is executed. Further, the setting of an output data format size corresponding to a setting parameter for designating the size of an output data format of each processed servo monitor signal A102 is executed.

In the process of a sampling setting in FIG. 11, the set values of sampling frequencies f1, f2, f3, f4 and f5 corresponding to setting parameters are set to designate a multiplication ratio or a division ratio between a sampling clock signal Clk1 generated from the servo clock generator 0204 and sampling clock signals Clk2, Clk3, Clk4 and Clk5 generated from the sampling controller 0303. Incidentally, these setting parameters in FIG. 11 are set from the external PC 0002 to the system controller 0111 via the external I/F unit 0110. As another method, it is also possible to store in advance set information in a program memory (not shown) lying inside the optical disk drive 0001 and allow the system controller 0111 to set the set information stored in the program memory to the inside of the system controller 0111.

<<Servo Observation Setting Flow>>

FIG. 12 is a diagram showing a setting process flow for observing a servo monitor signal A001 in the optical disk drive 0001 according to the first embodiment of the present invention shown in FIGS. 1 through 11.

In FIG. 12, Step S101 is a buffer memory setting step. Step S102 is a servo monitor signal setting step. Step S103 is a sampling setting step.

At the buffer memory setting step of Step S101 in FIG. 12, the memory access controller 0304 of the buffer controller 0108 ensures the processed servo monitor signal store area shown in FIG. 9 inside the buffer memory unit 0109, based on the set information about the start address ADRS1 and the end address ADRS2 set to the system controller 0111.

At the servo monitor signal setting step of Step S102 in FIG. 12, the output data selector 0402 provided inside the servo monitor signal processor 0302 of the buffer controller 0108 designates data outputted as the processed servo monitor signal A102, based on the set information about the type of servo monitor signal and the number of the servo monitor signals both set to the system controller 0111. The waveform data bit precision converter 0401 provided inside the servo monitor signal processor 0302 designates a process bit precision of waveform data A001*a*, based on the set information about the waveform data bit precision set to the system controller 0111. Further, the output data generator 0403 provided inside the servo monitor signal processor 0302 determines a data size and format of the processed servo monitor signal A102, based on the set information about the output data format size set to the system controller 0111.

At the sampling setting step of Step S103 in FIG. 12, the servo clock generator 0204 of the servo controller 0106 sets the frequency f1 of the servo clock signal Clk1 supplied to the waveform data output unit 0201, the logic signal output unit 0202 and the status information output unit 0203, based on the sampling frequency set value set to the system controller 0111. The sampling controller 0303 sets the frequency f2 of the sampling clock signal Clk2, the frequency f3 of the sampling clock signal Clk3, the frequency f4 of the sampling clock signal Clk4 and the frequency f5 of the sampling clock signal Clk5 respectively supplied to the read data processor 0301, the servo monitor signal processor 0302 and the memory access controller 0304. Incidentally, the sequence of execution of the processes from Step S101 to Step S103 shown in FIG. 12 is illustrated as one example, but may be changed to an arbitrary execution sequence.

Thus, the optical disk drive 0001 according to the first embodiment of the present invention shown in FIGS. 1 through 12 is capable of executing the setting processes from Step S101 to Step S103 of the setting process flow shown in FIG. 12, using the setting parameters shown in FIG. 11. Consequently, when the servo monitor signal A001 in the optical disk drive 0001 is outputted to the external PC 0002, the observer is able to arbitrarily set the memory capacity of the processed servo monitor signal store area in the buffer memory unit 0109 used in the observation of each servo monitor signal A001, the type of servo monitor signal A001 to be observed, the number of servo monitor signals A001 to be observed, the bit precision of waveform data A001*a*, a sampling precision at the storing of the servo monitor signal A001 to be observed in the buffer memory unit 0109, etc.

According to the first embodiment of the present invention shown in FIGS. 1 through 12, when the signals in the servo controller are observed without dismounting the optical disk drive, the signals can be stored in the memory lying thereinside, and both data of data read from the optical disk and the signals in the servo controller can be stored in the memory lying in the optical disk drive according to the time division process. Thus, both data can be outputted to the PC lying outside the optical disk drive and observed thereat, and hence the comprehensive characteristic analysis of the optical disk drive being in operation can easily be executed.

The plurality of types of signals in the servo controller can be stored in the memory lying inside the optical disk drive and outputted to the PC lying outside the optical disk drive via the external I/F unit 0110. Therefore, when the servo controller internal signals fetched in the PC are subjected to a digital data analysis, the waveforms of the servo controller internal signals can be reproduced on the PC using a waveform drawing application or the like. It is thus possible to observe the waveforms of the servo controller internal signals of the optical disk drive only by the optical disk drive and the external PC without using external measurement devices such as an oscilloscope, a logic analyzer, a data recorder, etc. Further, since setting conditions taken when the servo controller internal signals are observed with respect to the optical disk drive from the external PC, can be designated in detail, the characteristic analysis of the optical disk drive being in operation can be carried out easily and in detail.

Second Embodiment

Configuration of Optical Disk Recording and Reproducing Drive

Figure 13:
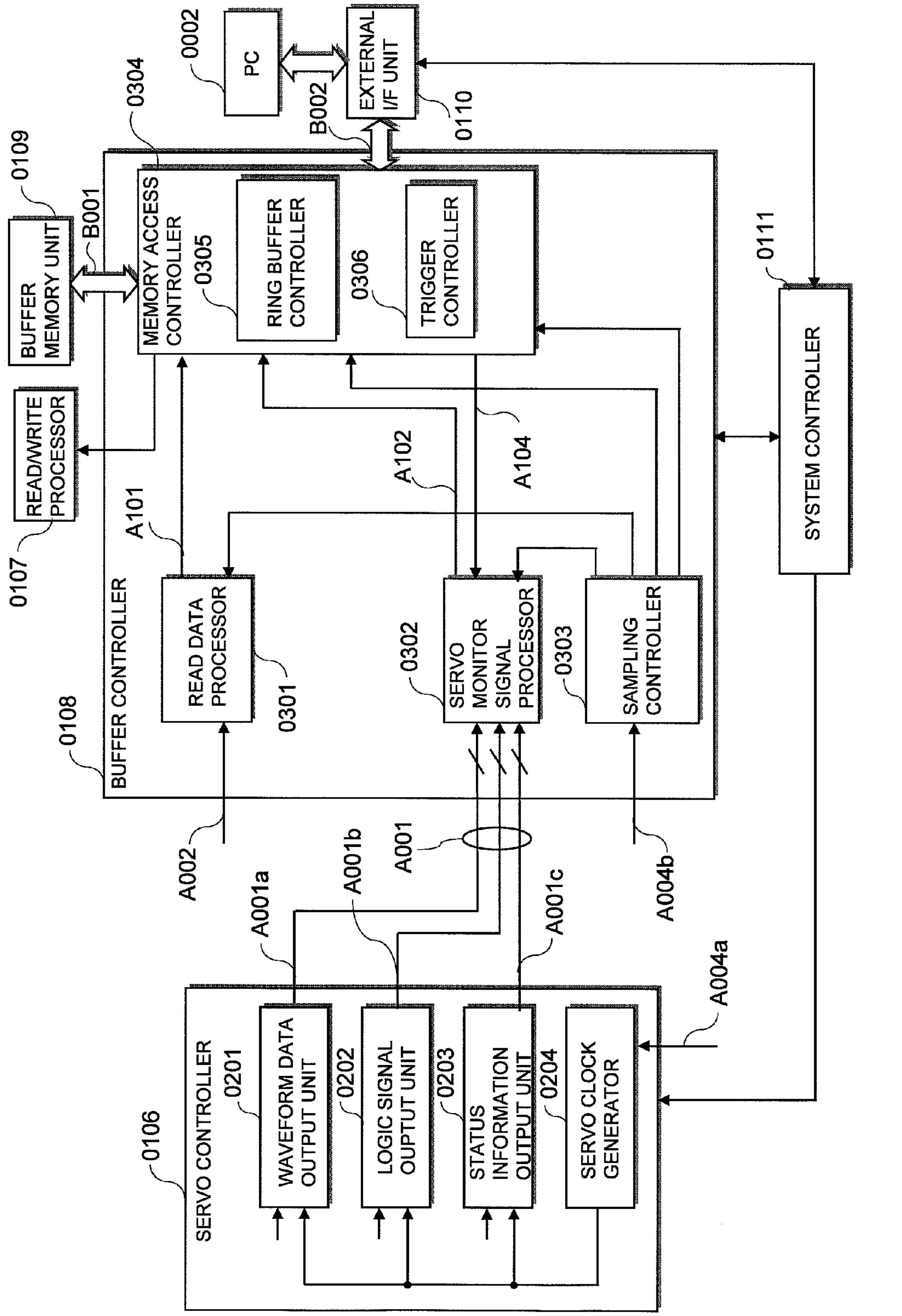
FIG. 13 is a diagram illustrating a configuration of an optical disk recording and reproducing drive according to a second embodiment of the present invention.

FIG. 13 is a diagram showing a configuration of an optical disk recording and reproducing drive according to a second embodiment of the present invention.

The optical disk recording and reproducing drive according to the second embodiment of the present invention shown in FIG. 13 is different from the optical disk drive according to the first embodiment of the present invention shown in FIGS. 1 through 12 in that a trigger controller 0306 is added to a memory access controller 0304 of a buffer controller 0108 shown in FIG. 13.

The trigger controller 0306 of the buffer controller 0108 shown in FIG. 13 performs a trigger determining process on a processed servo monitor signal A102 supplied from a servo monitor signal processor 0302 to the memory access controller 0304, based on settings from a system controller 0111. This trigger determining process will be explained in detail later.

When the trigger controller 0306 has made a determination as to trigger generation, the trigger controller 0306 executes the notification of the trigger generation to the memory access controller 0304. The memory access controller 0304 having received the notification of the trigger generation executes control on the start and stop of the operation of storing the processed servo monitor signal A102 in a buffer memory unit 0109, based on the settings from the system controller 0111.

In the optical disk drive 0001 according to the second embodiment of the present invention shown in FIG. 13, the trigger controller 0306 is able to store a processed servo monitor signal A102 in a predetermined period of time immediately after the time of trigger generation, in the buffer memory unit 0109 by executing the above-described trigger determining process.

<<Trigger Condition Setting Parameters>>

Figures 14, 15:
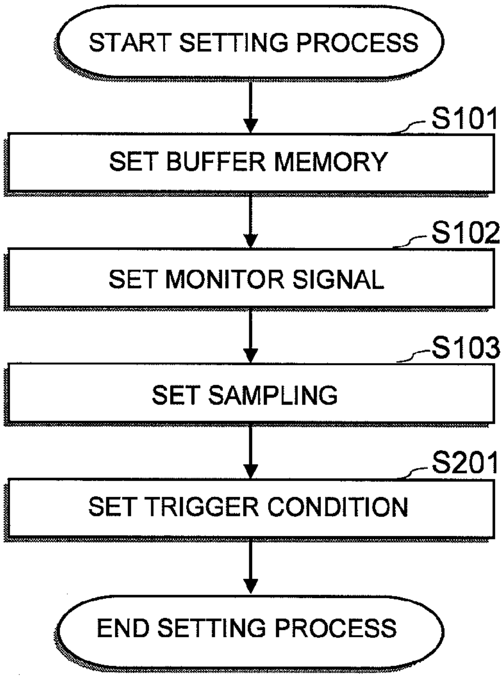
FIG. 14 is a diagram showing trigger condition setting parameters employed in the optical disk drive according to the second embodiment of the present invention shown in FIG. 13.
FIG. 15 is a diagram illustrating a setting process flow for observing a servo monitor signal A001 in the optical disk drive according to the second embodiment of the present invention shown in FIGS. 13 through 14.

FIG. 14 is a diagram showing trigger condition setting parameters employed in the optical disk drive according to the second embodiment of the present invention shown in FIG. 13.

As shown in FIG. 14, the trigger condition setting parameters include a trigger determination target signal 0601, a trigger edge 0602, a trigger level 0603 and a delay time 0604 corresponding to setting parameters for designating a trigger determination condition about a processed servo monitor signal A102 supplied from the servo monitor signal processor 0302 to the memory access controller 0304.

The trigger determination target signal 0601 is a setting parameter for designating data targeted for trigger determination from a plurality of types of data of the processed servo monitor signal A102. One type is selected from waveform data A001*a*, a logic signal A001*b* and status information A001*c* to set data targeted for trigger determination. Incidentally, when the respective information of the waveform data A001*a*, the logic signal A001*b* and the status information A001*c* contain a plurality of types of information, one type is selected from the plurality of types of information to set trigger determination target data.

The trigger edge 0602 is a setting parameter for designating the direction of an edge taken as trigger determination target data from three of a rising edge, a falling edge and bidirectional edges.

The trigger level 0603 is a setting parameter made effective when waveform data A001*a* of multi-valued digital data is designated to the trigger determination target signal 0601. The trigger level 0603 sets the amplitude level of a determination threshold value for executing a trigger determining process.

The delay time 0604 is a parameter for setting a predetermined time taken to continue the storing of data in the buffer memory unit 0109 immediately after the trigger generation. A sampling time may be designated for the designation of the delay time 0604. Alternatively, the delay time 0604 may be designated by the number of samples or the like. When the delay time 0604 is designated by the sampling time, it is also possible to convert it to the number of samples by the system controller 0111 or the like lying inside the optical disk drive 0001. When, for example, the delay time 0604 is designated to zero, the storing of data in the buffer memory unit 0109 is stopped immediately after the trigger generation. Data in the ring buffer becomes data indicative of only the state prior to the trigger generation. When the delay time 0604 is designated to a sampling time or the number of samples corresponding to one-half the memory capacity of the ring buffer 0109, the position of trigger generation at the data of the ring buffer 0109 takes the central position of a data area of the ring buffer 0109 or its start position. Further, when the delay time 0604 is set to a value equivalent to more than or equal to the memory capacity of the ring buffer 0109, the data stored inside the ring buffer becomes data indicative of only the state after the trigger generation.

A trigger setting process at the optical disk drive according to the second embodiment of the present invention shown in FIGS. 13 and 14 can also be brought to a combination of the waveform data A001*a*, th logic signal A001*b* and the status information A001*c*. When the respective information of the waveform data A001*a*, logic signal A001*b* and status information A001*c* include a plurality of types of information, the trigger setting process may be set to an arbitrary combination thereof. In this case, the trigger controller 0306 executes a trigger determining process about a plurality of data and signals and executes a determination as to trigger establishment according to an AND condition and an OR condition. Respective setting parameters for the trigger setting process can be set from the external PC 0002 to the system controller 0111 via the external I/F unit 0110 in a manner similar to the respective setting parameters shown in FIG. 11. As another method, it is also possible to store in advance set information in a program memory (not shown) lying inside the optical disk drive 0001 and allow the system controller 0111 to set the set information stored in the program memory to the inside of the system controller 0111.

<<Servo Observation Setting Flow>>

FIG. 15 is a diagram showing a setting process flow for observing a servo monitor signal A001 in the optical disk drive according to the second embodiment of the present invention shown in FIGS. 13 and 14.

As compared with the setting process flow shown in FIG. 12 for observing the servo monitor signal A001 in the optical disk drive 0001 according to the first embodiment of the present invention shown in FIGS. 1 through 11, a trigger setting step of Step S201 is added to the setting process flow.

At the trigger condition setting step of Step S201 in FIG. 15, the trigger controller 0306 selects trigger-target data designated from the processed servo monitor signal A102 outputted from the servo monitor signal processor 0302, based on the trigger determination target signal 0601 set to the system controller 0111. Thereafter, the trigger controller 0306 holds therein set information about the trigger edge 0602 and the trigger level 0603 set to the system controller 0111 and makes preparations for the implementation of a trigger determining process. The memory access controller 0304 holds therein set information about the delay time 0604 set to the system controller 0111 and makes preparations for the operation of counting the number of samples about the data stored in the buffer memory unit 0109 from immediately after the trigger generation. It is also possible to hold the set information about the delay time 0604 in the trigger controller 0306, execute a delay time control process by the trigger controller 0306, and notify a store stop instruction to the memory access controller 0304 after the delay time has elapsed. Incidentally, in a manner similar to FIG. 12 described above, the sequence of execution of the processes from Step S101 to Step S201 shown in FIG. 15 is shown as one example, but may be changed to an arbitrary execution sequence. Further, since the trigger condition of Step S201 in the setting process flow of FIG. 15 can be set using the setting parameters shown in FIG. 14, it is possible to execute various trigger operations in the optical disk drive 0001.

<<Trigger Operation>>

FIG. 16 is a diagram showing a trigger operation of the optical disk drive according to the second embodiment of the present invention shown in FIGS. 13 through 15.

FIG. 16 shows, as one example of the trigger setting of the trigger condition setting parameters shown in FIG. 14, the case where the trigger determination target signal 0601 is set to one type of waveform data A001*a* of the processed servo monitor signal A102, the trigger edge 0602 is set to the rising edge, the trigger level 0603 is set to a level shown in FIG. 16, and the delay time 0604 is set to a period dt shown in FIG. 16. In FIG. 16, a time tA indicates the time at which a trigger has occurred, and a time tB indicates the time at which the storing of data has stopped.

A description will be given to an operation up to the establishment of a trigger condition at the time tA of FIG. 16.

In the optical disk recording and reproducing drive according to the second embodiment of the present invention shown in FIG. 13, the memory access controller 0304 starts the storing of the processed servo monitor signal A102 in the buffer memory unit 0109 in response to a data store start instruction issued from the system controller 0111 and executes a trigger condition determining process. On the other hand, since the buffer memory unit 0109 is configured as the ring buffer, the buffer memory unit 0109 continues a continuous data overwriting operation even if the buffer memory unit 0109 is fully filled with data for one round of the ring buffer during a period of duration of data store. Thus, the buffer memory unit 0109 configured as the ring buffer continues the data overwriting operation and is thereby placed in a standby state of trigger generation.

A description will next be given to an operation after the trigger condition has been established at the time tA of FIG. 16.

When, at the time tA, the trigger condition is met by the trigger determination target signal 0601 and the memory access controller 0304 receives the notification of the trigger generation from the trigger controller 0306, the memory access controller 0304 continues the storing of data in the buffer memory unit 0109 during the period dt designated by the delay time 0604 from the time tA. Thereafter, when the time tB at which the period dt has elapsed from the time tA is reached, the memory access controller 0304 stops the data storing of the buffer memory unit 0109. Thereafter, the data stored in the buffer memory unit 0109 is transferred to the external PC 0002 by the memory access controller 0304, so that phenomenal data in a predetermined range can be observed in accordance with the trigger condition setting shown in FIG. 14.

Figure 17:
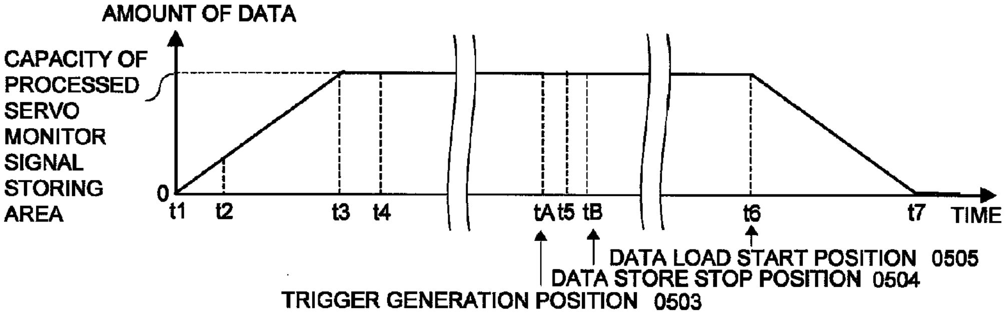
FIG. 17 is a diagram illustrating changes in the amount of data in a processed servo monitor signal store area lying inside a buffer memory unit 0109 in the optical disk drive according to the second embodiment of the present invention shown in FIGS. 13 through 16.

FIG. 17 is a diagram illustrating changes in the amount of data in a processed servo monitor signal store area lying inside the buffer memory unit 0109 in the optical disk drive according to the second embodiment of the present invention shown in FIGS. 13 through 16.

In FIG. 17, a time t1 indicates the time at which the storing of data in the buffer memory unit 0109 is started, a time t2 indicates the time at which during a data store operation, the buffer memory unit 0109 configured by the ring buffer is in a state of being not charged with the data stored area 0501 shown in FIG. 10, a time t3 indicates the time at which during the data store operation, the buffer memory unit 0109 is charged with the data stored area 0501, a time t4 indicates the time at which during the data store operation, the data stored area 0501 of the buffer memory unit 0109 is overwritten with newly-fetched data, a time to indicates the time for trigger generation, a time t5 indicates the time during which the set delay time 0604 elapses after the trigger generation, a time tB indicates the time at which the data storing has stopped with the elapse of the set delay time 0604, a time t6 indicates the time at which the loading of data in the buffer memory unit 0109 is started after the data storing has stopped, and a time t7 indicates the time at which the loading of all data in the buffer memory unit 0109 has been completed after the data storing has stopped.

<<Internal State of Buffer Memory Unit>>

FIGS. 18 through 26 are respectively diagrams showing internal states of the buffer memory unit 0109 configured by the ring buffer at the respective times from the times t1 to t7 in the optical disk drive according to the second embodiment of the present invention shown in FIGS. 13 through 17.

Referring to FIGS. 18 through 26, a description will be given below to the operation of storing a processed servo monitor signal A102 in the buffer memory unit 0109 configured by the ring buffer and the operation of loading the same. FIGS. 18 through 26 respectively show an example where a start address ADRS1 is designated as an initial value of a write pointer WADRS.

Figure 18:
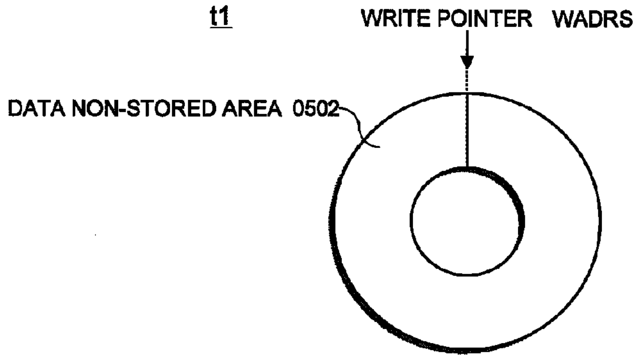
FIG. 18 is a diagram depicting an internal state of the buffer memory unit 0109 configured by a ring buffer at a time t1 in the optical disk drive according to the second embodiment of the present invention shown in FIGS. 13 through 17.

FIG. 18 is a diagram depicting the internal state of the buffer memory unit 0109 configured by the ring buffer at the time t1 in the optical disk drive according to the second embodiment of the present invention shown in FIGS. 13 through 17.

First, at the time t1 of FIG. 18, the ring buffer controller 0305 sets the write pointer WADRS to the inside of the buffer memory unit 0109 configured by the ring buffer before the start of storing the processed servo monitor signal A102 in the buffer memory unit 0109 configured by the ring buffer. Further, at the time t1 of FIG. 18, the trigger controller 0306 starts a trigger determining process.

Figure 19:
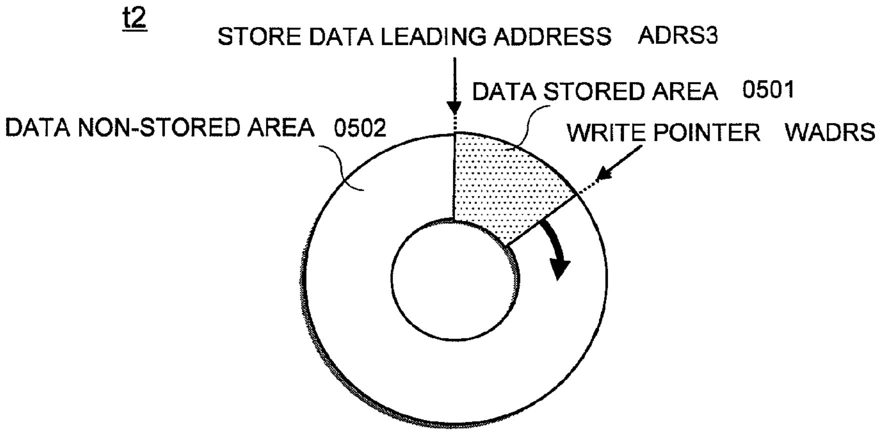
FIG. 19 is a diagram showing an internal state of the buffer memory unit 0109 configured by the ring buffer at a time t2 in the optical disk drive according to the second embodiment of the present invention shown in FIGS. 13 through 17.

FIG. 19 is a diagram showing the internal state of the buffer memory unit 0109 configured by the ring buffer at the time t2 in the optical disk drive according to the second embodiment of the present invention shown in FIGS. 13 through 17.

Namely, when the storing of data in the buffer memory unit 0109 configured by the ring buffer is started, the memory access controller 0304 starts data storing to an address indicated by the write pointer WADRS of FIG. 19. The ring buffer controller 0305 increments the value of the write pointer WADRS in response to the data storing of the memory access controller 0304. Further, the trigger controller 0306 executes a trigger determining process to monitor the generation of a trigger.

Figure 20:
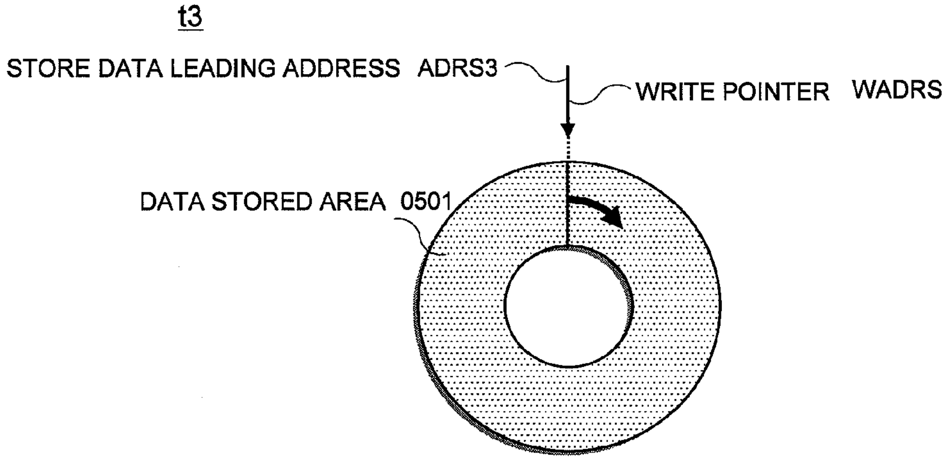
FIG. 20 is a diagram illustrating an internal state of the buffer memory unit 0109 configured by the ring buffer at a time t3 in the optical disk drive according to the second embodiment of the present invention shown in FIGS. 13 through 17.

FIG. 20 is a diagram illustrating the internal state of the buffer memory unit 0109 configured by the ring buffer at the time t3 in the optical disk drive according to the second embodiment of the present invention shown in FIGS. 13 through 17.

Namely, when the storing of data in the buffer memory unit 0109 configured by the ring buffer is continued, the write pointer WADRS reaches a store data leading address ADRS3 as shown in FIG. 20, so that the data stored area 0501 becomes equal to one round of the ring buffer.

FIG. 21 is a diagram depicting the internal state of the buffer memory unit 0109 configured by the ring buffer at the time t4 in the optical disk drive according to the second embodiment of the present invention shown in FIGS. 13 through 17.

Namely, the memory access controller 0304 performs overwriting of data to be newly stored from the leading address of the data stored area 0501 from the time t4 as shown in FIG. 21. According to it, the store data leading address ADRS3 in the buffer memory unit 0109 configured by the ring buffer follows the write pointer WADRS, and a data overwritten area 0507 due to a wait for trigger generation is generated.

Figure 22:
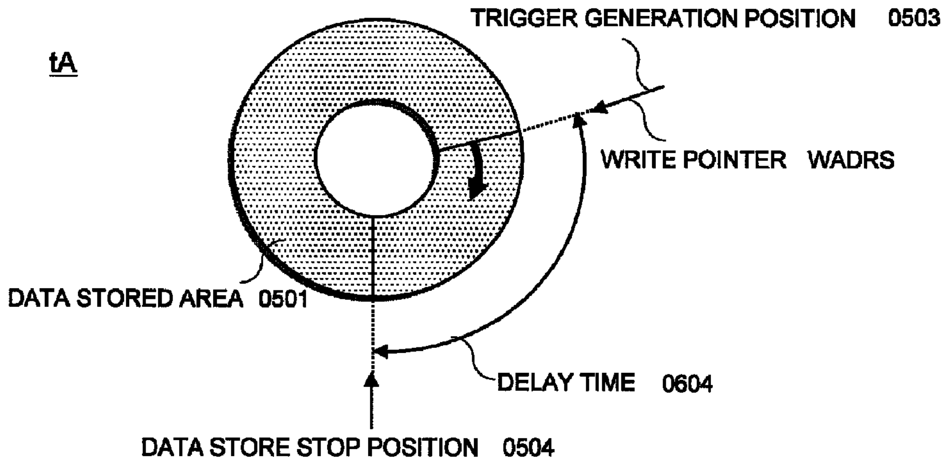
FIG. 22 is a diagram showing an internal state of the buffer memory unit 0109 configured by the ring buffer at a time tA in the optical disk drive according to the second embodiment of the present invention shown in FIGS. 13 through 17.

FIG. 22 is a diagram showing the internal state of the buffer memory unit 0109 configured by the ring buffer at the time tA in the optical disk drive according to the second embodiment of the present invention shown in FIGS. 13 through 17.

Namely, at the time tA at which a trigger is generated as shown in FIG. 22, the memory access controller 0304 sets an address for the write pointer WADRS at the trigger generation as a trigger generation position 0503.

Figure 23:
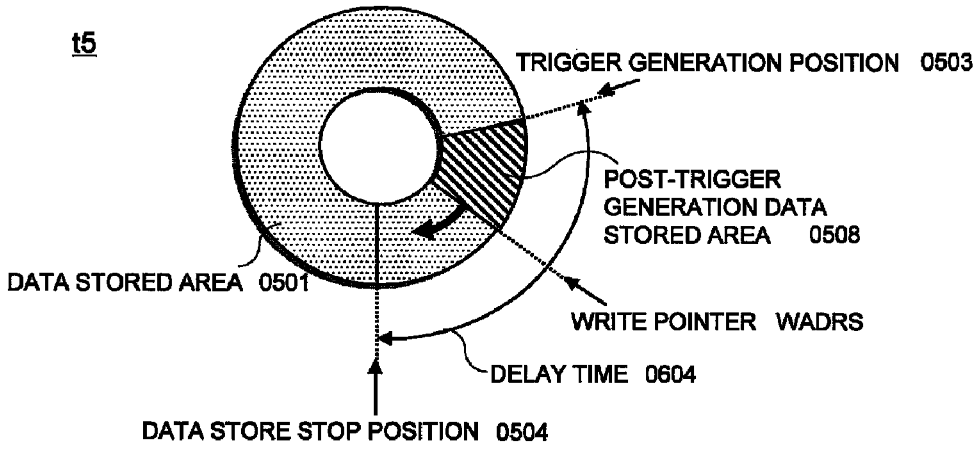
FIG. 23 is a diagram showing an internal state of the buffer memory unit 0109 configured by the ring buffer at a time t5 in the optical disk drive according to the second embodiment of the present invention shown in FIGS. 13 through 17.

FIG. 23 is a diagram showing the internal state of the buffer memory unit 0109 configured by the ring buffer at the time t5 in the optical disk drive according to the second embodiment of the present invention shown in FIGS. 13 through 17.

Namely, since the memory access controller 0304 continues the storing of data in the buffer memory unit 0109 configured by the ring buffer during a period of a set delay time 0604 after the trigger generation as shown in FIG. 23, a post-trigger generation data stored area 0508 is generated.

Figure 24:
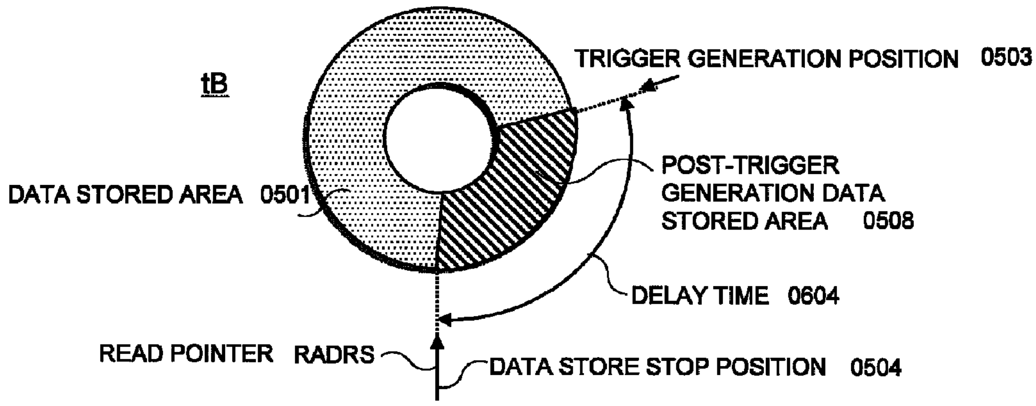
FIG. 24 is a diagram illustrating an internal state of the buffer memory unit 0109 configured by the ring buffer at a time tB in the optical disk drive according to the second embodiment of the present invention shown in FIGS. 13 through 17.

FIG. 24 is a diagram illustrating the internal state of the buffer memory unit 0109 configured by the ring buffer at the time tB in the optical disk drive according to the second embodiment of the present invention shown in FIGS. 13 through 17.

Namely, as shown in FIG. 24, the memory access controller 0304 stops data storing at a data store stop position 0504 at the completion of storing of data corresponding to a period specified or designated by the delay time 0604 in the buffer memory unit 0109 configured by the ring buffer. After the stop of its data storing, the ring buffer controller 0305 sets a read pointer RADRS to an address for leading data in a data area to be outputted, based on the control from the memory access controller 0304. Here, as a method for determining whether the storing of the data corresponding to the period designated by the delay time 0604 has been carried out, there is mentioned that, for example, upon execution of data storing subsequent to the time to at which the trigger shown in FIG. 22 has occurred, the value of the set delay time 0604 is decremented by 1 with the storing of the data, and the timing at which the value of the delay time 0604 becomes zero, can be determined to be a timing for completion of the storing of the data corresponding to the period designated by the delay time 0604.

Figure 25:
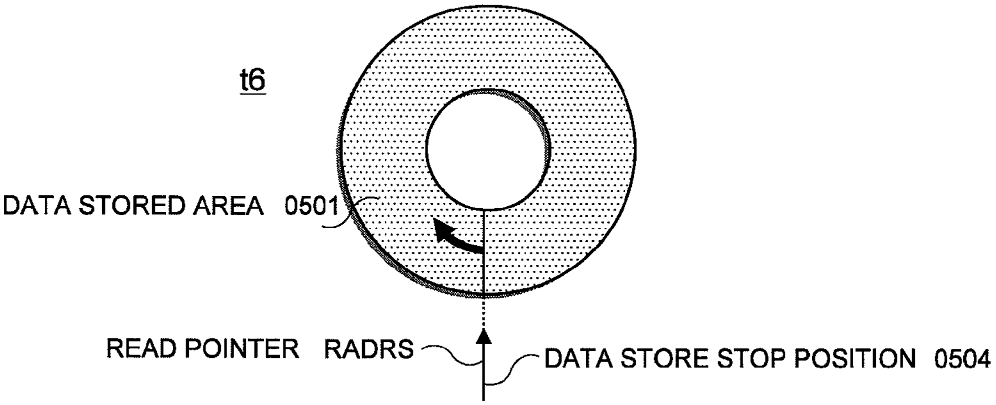
FIG. 25 is a diagram showing an internal state of the buffer memory unit 0109 configured by the ring buffer at a time t6 in the optical disk drive according to the second embodiment of the present invention shown in FIGS. 13 through 17.

FIG. 25 is a diagram showing the internal state of the buffer memory unit 0109 configured by the ring buffer at the time t6 in the optical disk drive according to the second embodiment of the present invention shown in FIGS. 13 through 17.

When a data load start instruction is supplied from the system controller 0111 to the memory access controller 0304, the memory access controller 0304 starts the loading of data stored in the buffer memory unit 0109 configured by the ring buffer from the read pointer RADRS corresponding to a data load start position 0505 shown in FIG. 25.

Figure 26:
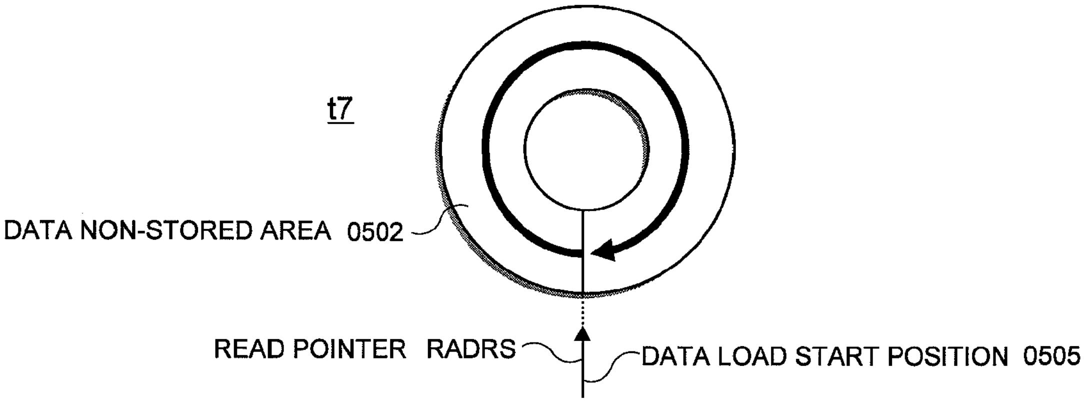
FIG. 26 is a diagram showing an internal state of the buffer memory unit 0109 configured by the ring buffer at a time t7 in the optical disk drive according to the second embodiment of the present invention shown in FIGS. 13 through 17.

FIG. 26 is a diagram showing the internal state of the buffer memory unit 0109 configured by the ring buffer at the time t7 in the optical disk drive according to the second embodiment of the present invention shown in FIGS. 13 through 17.

Namely, as shown in FIG. 26, the memory access controller 0304 completes the loading of all data stored in the buffer memory unit 0109 configured by the ring buffer at the time t7.

<<Read Pointer and Write Pointer>>

Figure 27:
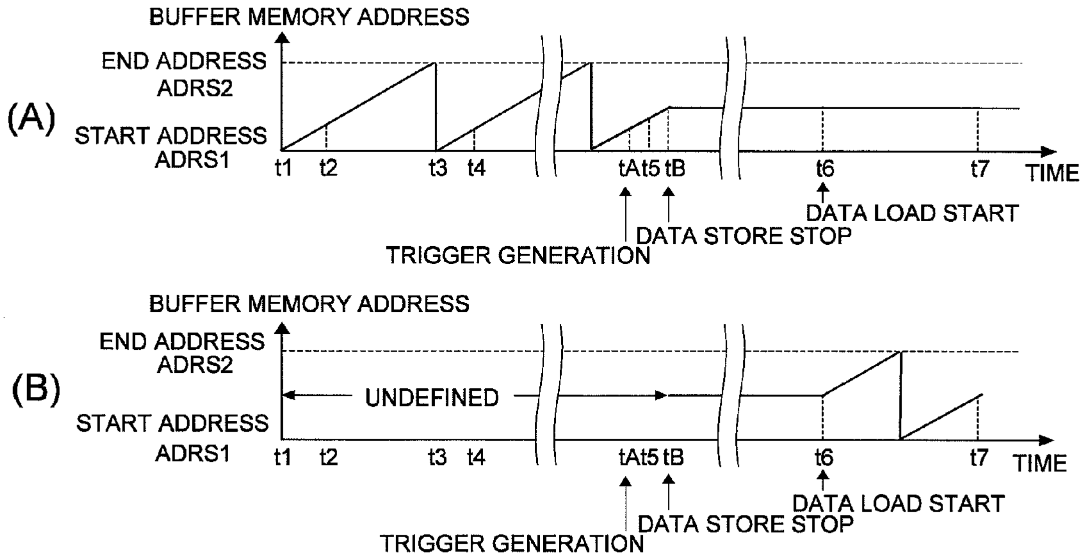
FIG. 27 is a diagram illustrating changes in the values of a read pointer RADRS and a write pointer WADRS inside the buffer memory unit 0109 configured by the ring buffer in the optical disk drive according to the second embodiment of the present invention shown in FIGS. 13 through 26.

FIG. 27 is a diagram illustrating changes in the values of the read pointer RADRS and the write pointer WADRS in the buffer memory unit 0109 configured by the ring buffer in the optical disk drive according to the second embodiment of the present invention shown in FIGS. 13 through 26.

In FIG. 27, a waveform (A) indicates a change in the value of the write pointer WADRS in the buffer memory unit 0109 configured by the ring buffer, and a waveform (B) indicates a change in the value of the read pointer RADRS in the buffer memory unit 0109 configured by the ring buffer.

The waveform (A) of FIG. 27 indicates an example where a start address ADRS1 is designated as the initial value of the write pointer WADRS. When the storing of data in the buffer memory unit 0109 configured by the ring buffer is started at the time t1, the ring buffer controller 0305 increments the value of the write pointer WADRS in accordance with the data storing. When the write pointer WADRS reaches an end address ADRS2 at the time t3 through the time t2, the value of the write pointer WADRS is returned to the value of the start address ADRS1. The operation from the times t1 to t3 is repeated during trigger non-generation.

When a trigger is generated at the time tA, the memory access controller 0304 thereafter continues data storing during the set delay time 0604. At the completion of the storing of data corresponding to the period of the delay time 0604 at the time tB, the memory access controller 0304 stops the increment of the value of the write pointer WADRS.

At the waveform (B) of FIG. 27, the value of the read pointer RADRS is in a non-defined state before the time tB. At the time tB, the ring buffer controller 0305 sets the value of the read pointer RADRS to the address shown in FIG. 25. When the system controller 0111 supplies a data load start instruction to the memory access controller 0304 at the time t6, the loading of data from the buffer memory unit 0109 to the external I/F unit 0110 is started and the value of the read pointer RADRS is hence incremented with the data loading. When the read address reaches an end address ADRS2, the value of the read pointer is returned to the value of the start address ADRS1 in a manner similar to the case of the above write address. Thereafter, at the time t7, all data in the buffer memory unit 0109 configured by the ring buffer are outputted, and the change in the value of the read pointer is stopped when the data output is completed.

Upon the operation of storing the processed servo monitor signal A102 using the buffer memory unit 0109 configured by the ring buffer, the storing of data prior to the trigger generation in the ring buffer when the trigger is generated, is made possible by continuation of overwriting of old data in the ring buffer with new data during the period of a wait for trigger generation. Setting the delay time 0604 enables an adjustment to the data store period after the trigger generation. Thus, when phenomenal data before and after the trigger generation are stored in the buffer memory unit 0109, the data can be stored in the buffer memory unit 0109 in a state in which an observation condition and the ratio between the amounts of data before and after the trigger generation have been set. Further, since the amount or rate of transfer of data from the optical disk drive 0001 to the external PC 0002 corresponds to one round of the ring buffer per one trigger operation, the memory capacity of a data reception buffer memory in the external PC 0002 can be reduced. As the rate of the transfer of the data to the external PC 0002, data corresponding to one round of the ring buffer may be transferred once. Therefore, the transfer load on the external I/F unit 0110 can be reduced as compared with the case of the continuous transfer of the data in the ring buffer. It is also possible to reduce power consumption taken for the data transfer. Since the continuous transfer of the data to the external PC 0002 becomes unnecessary at other than the transfer of the data corresponding to one round of the ring buffer after the trigger generation, it is possible to reduce the transfer load on the external I/F unit 0110.

<<Generation of Trigger >>

Figure 28:
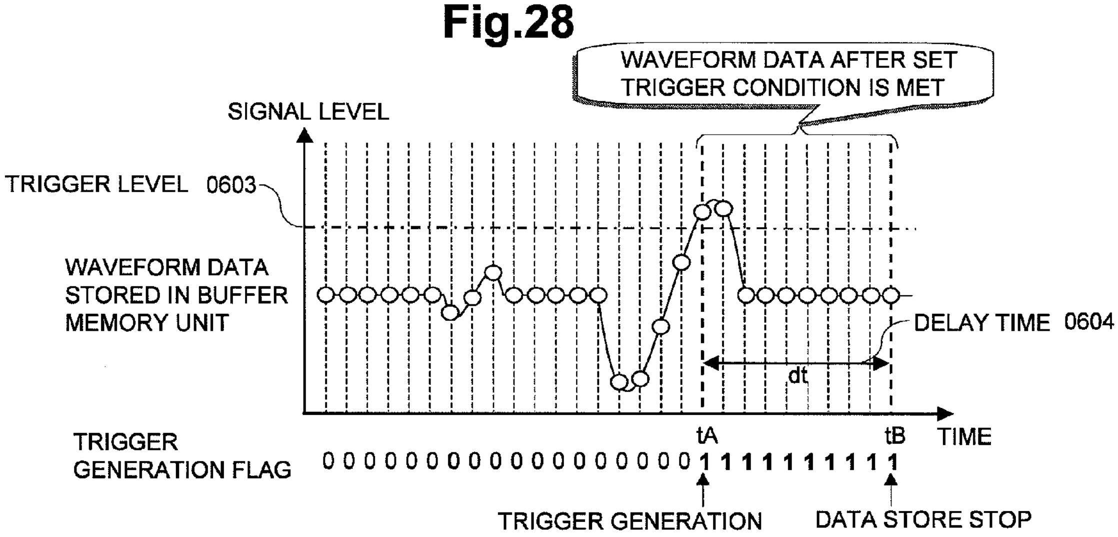
FIG. 28 is a diagram depicting trigger generation for data storing in the buffer memory unit 0109 in the optical disk drive according to the second embodiment of the present invention shown in FIGS. 13 through 27.

FIG. 28 is a diagram depicting trigger generation for data storing in the buffer memory unit 0109 in the optical disk drive according to the second embodiment of the present invention shown in FIGS. 13 through 27.

The memory access controller 0304 continues to store data corresponding to a period dt indicated by a delay time 0604 from a trigger generation position 0503 at a time tA to a time tB in the buffer memory unit 0109, based on the notification of the generation of a trigger generated from the trigger controller 0306 at the trigger generation and stops a data store operation at a data store stop position 0504 at the time tB. Thereafter, the memory access controller 0304 transfers data to the PC 0002 lying outside the optical disk drive 0001 via the external I/F unit 0110 in response to a data load start instruction issued from the system controller 0111. When the transferred data is however processed by the PC 0002, it is not possible to determine the trigger generation position 0503 only by waveform data A001*a* lying in the transferred data.

Therefore, in the optical disk drive according to the second embodiment of the present invention shown in FIG. 28, a flag bit (hereinafter called trigger generation flag") indicative of trigger generation is located in one bit of the buffer control status signal A104. The trigger generation flag remains unchanged at "0" while no trigger is generated, assuming that the initial value is "0". With the timing at which the trigger is generated, the trigger generation flag changes from "0" to "1" in value and continues to be a value of "1" during a period designated by the corresponding delay time 0604. After the data storing at the period dt designated by the delay time 0604 has been completed and all the data in the ring buffer have been transferred to the external PC 0002, the trigger generation flag can be cleared from "1" to "0". It is also possible to clear the trigger generation flag from "1" to "0" before the start of the resumption of the data storing process by means of another method.

Thus, it is possible to easily observe stored data at the trigger generation timing from all data stored in the buffer memory unit 0109 by setting the trigger generation flag to the buffer control status signal A104 and referring to the trigger generation flag stored in the buffer memory unit 0109 along with the data.

According to the optical disk drive according to the second embodiment of the present invention shown in FIG. 28, when the signals in the servo controller are observed without dismounting the optical disk drive, a trigger function is added and a trigger determination condition is set. Thus, the optical disk drive is able to automatically store the signals in the servo controller at the times before and after the generation of a target phenomenon in its internal memory. Since the optical disk drive is able to automatically transfer the data stored in the internal memory to the external PC, it is possible to easily carry out a phenomenon analysis of the optical disk drive.

When the target phenomenon is observed in the optical disk drive equipped with no trigger function as in the second embodiment of the present invention, it is necessary to transfer all data from before the generation of the target phenomenon to after its generation to the external PC, further store all data transferred thereto inside the PC, and retrieve the target phenomenon from all the data stored therein. In this case, a memory or storage having a large capacity is needed inside the PC, and a process for retrieving the target phenomenon from huge amounts of data becomes necessary. On the other hand, in the optical disk drive according to the second embodiment of the present invention shown in FIG. 28, one round of the ring buffer is enough for the memory capacity necessary for the inside of the PC. Further, the signals in the servo controller at the times before and after the target phenomenon has occurred, have already been stored in the memory corresponding to one round of the ring buffer in a state of being added with trigger generation flag information. Therefore, the process of retrieving the target phenomenon from the large amounts of data also becomes unnecessary. As a result, when the phenomenon analysis of the optical disk drive is carried out, there is no need to add a high-capacity memory to the inside of the PC. Further, the phenomenon analysis can easily be carried out.

In the optical disk drive according to the second embodiment of the present invention shown in FIG. 28, as to the amount of data to be transferred from the optical disk drive to the PC, one round of the ring buffer is enough for executing the observation of the target phenomenon once, and once is enough even for the number of times that the data is transferred to the PC. Thus, since there is no need to always transfer data between the optical disk drive and the external PC, the transfer load on the external I/F unit 0110 can be reduced, and power consumption for the data transfer can be reduced.

Third Embodiment

Configuration of Optical Disk Recording and Reproducing Drive

Figure 29:
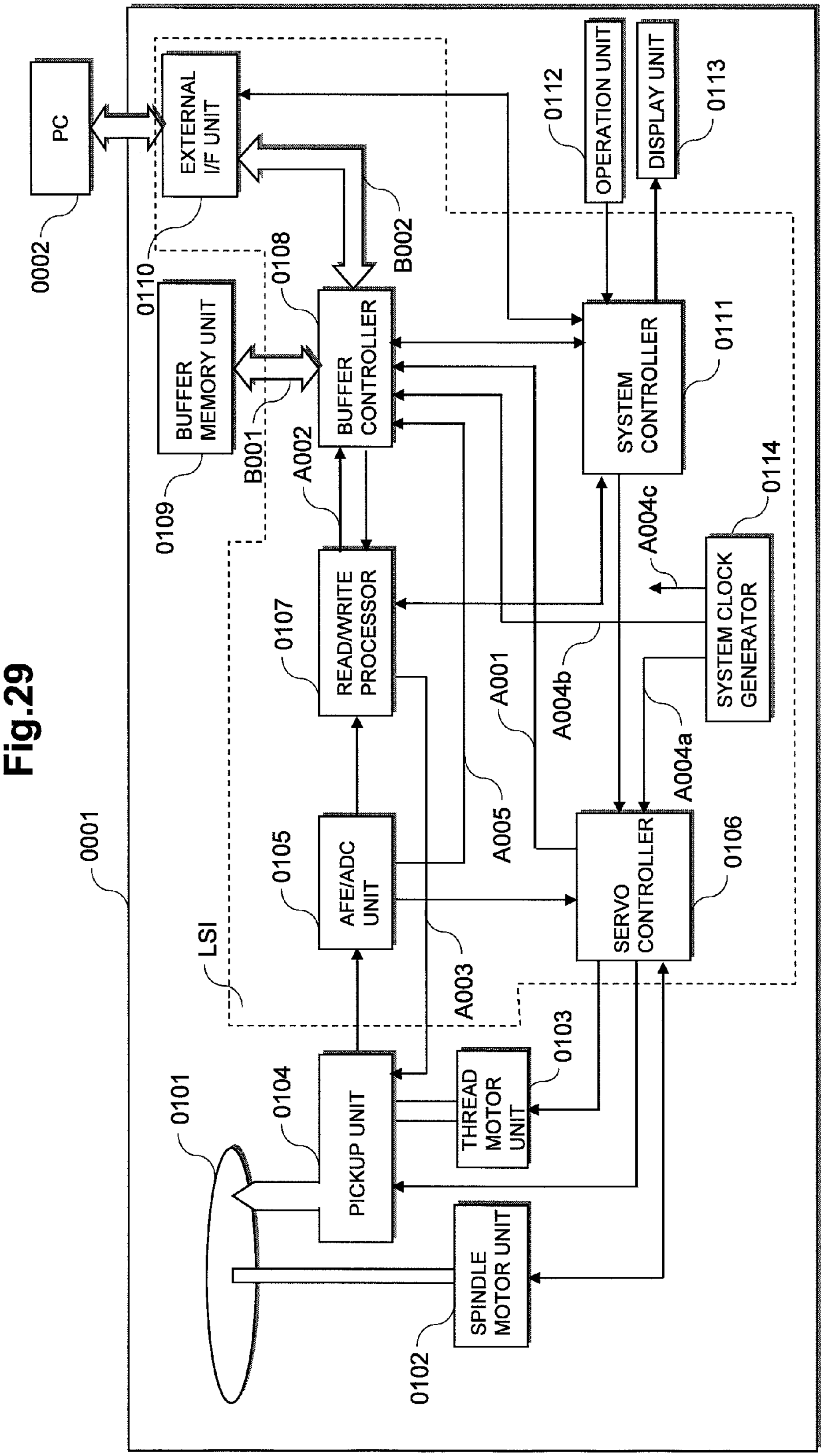
FIG. 29 is a diagram showing a configuration of an optical disk recording and reproducing drive according to a third embodiment of the present invention.

FIG. 29 is a diagram showing a configuration of an optical disk recording and reproducing drive according to a third embodiment of the present invention.

The optical disk recording and reproducing drive according to the third embodiment of the present invention shown in FIG. 29 is different from the optical disk drive according to the first embodiment of the present invention shown in FIGS. 1 through 12 in that an AFE/ADC unit 0105 shown in FIG. 29 has the function of outputting an RF signal generated and digitized inside the AFE/ADC unit 0105 to a buffer controller

0108 as an RF monitor signal A005 in such a manner as to be able to observe the RF signal outside the optical disk drive 0001.

According to the optical disk drive 0001 of the third embodiment of the present invention shown in FIG. 29, the RF monitor signal A005 can also be stored in a buffer memory unit 0109 in addition to a servo monitor signal A001. The RF monitor signal A005 can be transferred to a PC 0002 provided outside the optical disk drive 0001, using hardware similar to hardware for transferring read data A002 stored in the buffer memory unit 0109 to the PC 0002 lying outside the optical disk drive 0001.

Figure 30:
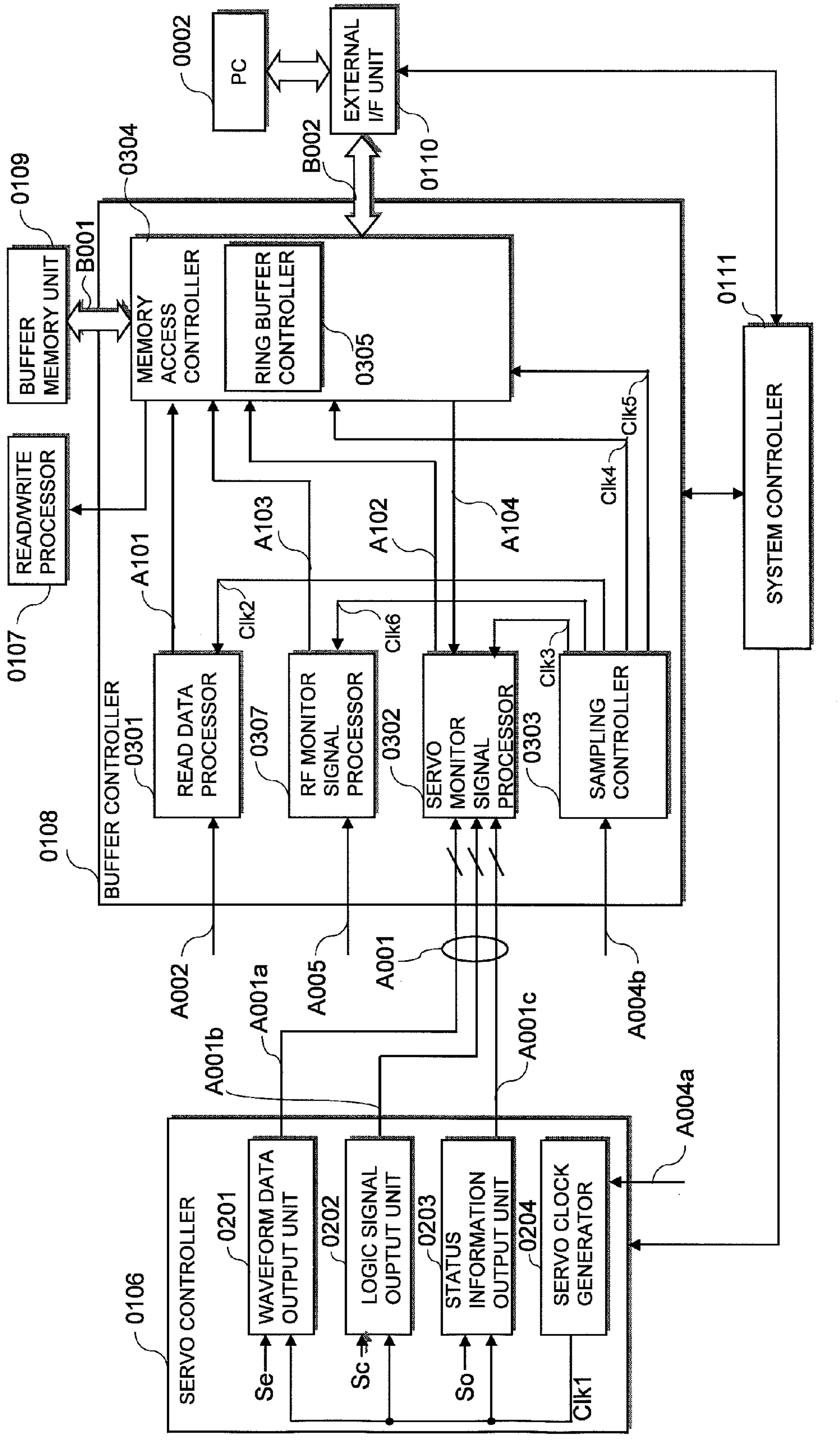
FIG. 30 is a diagram showing a detailed internal configuration of a servo controller 0106 and a buffer controller 0108 included in the optical disk drive according to the third embodiment of the present invention shown in FIG. 29.

FIG. 30 is a diagram showing a detailed internal configuration of a servo controller 0106 and the buffer controller 0108 included in the optical disk drive according to the third embodiment of the present invention shown in FIG. 29.

The optical disk recording and reproducing drive according to the third embodiment of the present invention shown in FIG. 30 is different from the optical disk drive according to the first embodiment of the present invention shown in FIGS. 1 through 12 in that an RF monitor signal processor 0307 is added to the buffer controller 0108 shown in FIG. 30. An input terminal of the RF monitor signal processor 0307 is supplied with the RF monitor signal A005 generated from the AFE/ADC unit 0105 shown in FIG. 29. A processed RF monitor signal A103 at an output terminal of the RF monitor signal processor 0307 is supplied to a memory access controller 0304.

A sampling controller 0303 of the buffer controller 0108 executes a multiplying process of a system clock signal A004*b* outputted from a system clock generator 0114 and a dividing process thereof, based on the control of a system controller 0111 to thereby generate a sampling clock signal Clk6 having a frequency f6 and supplies it to the RF monitor signal processor 0307.

The RF monitor signal processor 0307 takes in the RF monitor signal A005 in sync with the sampling clock signal Clk6 supplied from the sampling controller 0303 and thereby executes buffering thereof. The RF monitor signal processor 0307 buffers the RF monitor signal A005, based on the control of the system controller 0111 and the memory access controller 0304 to thereby generate burst data and outputs it as the processed RF monitor signal A103.

In the optical disk drive 0001 according to the third embodiment of the present invention shown in FIGS. 29 and 30, the memory access controller 0304 is able to take in the processed read data A101, processed servo monitor signal A102 and processed RF monitor signal A103 supplied thereto and select data to be stored when they are stored in the buffer memory unit 0109. A data transfer rate for the output of data to the memory access controller 0304 is set higher than a data transfer rate for the input of data to each of the read data processor 0301, servo monitor signal processor 0302 and RF monitor signal processor 0307. As a result, the memory access controller 0304 is able to store the processed read data A101, the processed servo monitor signal A102 and the processed RF monitor signal A103 in the buffer memory unit 0109 on a time-division basis.

According to the third embodiment of the present invention shown in FIGS. 29 and 30, when the signals and RF signal in the servo controller are observed without dismounting the optical disk drive, the signals and RF signal in the servo controller can be stored in the corresponding buffer memory lying in the optical disk drive, and data read from an optical disk by the optical disk drive and the signals and RF signal in the servo controller can be stored in the buffer memory lying inside the optical disk drive. Thus, the data read from the optical disk and the signals and RF signal in the servo controller can be outputted to the PC lying outside the optical disk drive and observed thereat. Hence the characteristic analysis of the optical disk drive being in operation can easily be executed.

Since the processed servo monitor signal A102 used as for a servo system signal and the processed RF monitor signal A103 used as for a read system signal can be observed approximately simultaneously, it is possible to easily carry out an analysis as to whether the cause of a failure occurs in either a servo system or a read system where a problem arises in the quality of reproduction. Since it is possible to store the signals and RF signal in the servo controller in the buffer memory in the optical disk drive as digital data and output the same to the PC lying outside the optical disk drive, the waveforms of the signals and RF signal in the servo controller can be reproduced inclusive of even temporal relations by using a waveform drawing application or the like on the PC when the digital data about the signals and RF signal in the servo controller, which have been fetched in the PC, are analyzed. As a result, it is possible to observe the waveforms of the signals and RF signal in the servo controller by means of the optical disk drive and the external PC without using external measurement devices such as an oscilloscope, a logic analyzer, a data recorder, etc.

In the optical disk drive 0001 according to the third embodiment of the present invention shown in FIGS. 29 and 30, the servo monitor signal A001 and the RF monitor signal A005 can be outputted in addition to the process of outputting the read data A002 given from the optical disk 0101 to the external PC 0002. As another embodiment, only the RM monitor signal A005 may be outputted in addition to the read data A002 from the optical disk 0101.

The buffer memory unit 0109 configured by the ring buffer and the trigger determination function in the optical disk drive 0001 according to the second embodiment of the present invention can also be added to the optical disk drive 0001 according to the third embodiment of the present invention shown in FIGS. 29 and 30. The processed RF monitor signal A103 may be targeted for trigger determination.

While the invention made above by the present inventors has been described specifically on the basis of the various embodiments, the present invention is not limited to the embodiments referred to above. It is needless to say that various changes can be made thereto within the scope not departing from the gist thereof.

By allowing a manufacturing process of a semiconductor chip for a semiconductor integrated circuit LSI to include a process for forming an on-chip dynamic random access memory (DRAM), for example, a synchronous dynamic random access memory configuring the buffer memory unit 0109 can be built in the semiconductor chip for the semiconductor integrated circuit LSI.

Further, the present invention is not limited to an optical disk recording and reproducing drive using a detachable/removable optical disk such as a CD, a DVD, a BD or the like. The present invention can also be applied to an HDD recording and reproducing apparatus using a hard disk fixed to a disk recording and reproducing drive.

What is claimed is:

1. A semiconductor integrated circuit mountable to a disk recording and reproducing drive comprising:

a spindle motor capable of rotatably driving a disk;

a pickup capable of executing a writing of data onto the disk and a reading of data from the disk;

a pickup drive motor capable of driving the pickup; and a buffer memory capable of storing therein the data read from the disk and the data written onto the disk, the semiconductor integrated circuit comprising:

a signal processor capable of generating the read data according to a process of an RF signal read from the pickup by the data reading; and a servo controller capable of controlling the spindle motor, the pickup and the pickup drive motor in response to a servo error signal read from the pickup, the semiconductor integrated circuit further comprising:

a memory controller supplied with the read data generated from the signal processor and a servo signal generated from the servo controller and coupleable to the buffer memory; and an external interface coupleable to an external device of the semiconductor integrated circuit and coupled to the memory controller, wherein the memory controller is capable of storing the read data and the servo signal in the buffer memory according to a time division process and transferring the read data and the servo signal stored in the buffer memory according to the time division process to the external device through the external interface.

2. The semiconductor integrated circuit according to claim 1, wherein an output data rate of the read data and the servo signal stored in the buffer memory by the memory controller according to the time division process is settable to a rate higher than an input data rate of the read data and the servo signal supplied from the signal processor and the servo controller to the memory controller.

3. The semiconductor integrated circuit according to claim 2, wherein when a period of a store interrupt has occurred in either of the read data and the servo signal stored in the buffer memory by the memory controller according to the time division process, the memory controller adds flag information indicative of the occurrence of the store interrupt to either thereof and stores the same in the buffer memory.

4. The semiconductor integrated circuit according to claim 3, wherein the servo signal is capable of being stored in a ring buffer configured in the buffer memory by the memory controller.

5. The semiconductor integrated circuit according to claim 4, wherein the memory controller detects whether an amplitude level of the servo signal stored in the ring buffer exceeds a predetermined value, and wherein the memory controller starts the storage of the servo signal in the ring buffer in response to the amplitude level having exceeded the predetermined value and stops the storage of the servo signal in the ring buffer after a predetermined time has elapsed.

6. The semiconductor integrated circuit according to claim 5, wherein when the servo signal exceeds one round of the ring buffer before the memory controller starts the storage of the servo signal in the ring buffer in response to the amplitude level having exceeded the predetermined value, the memory controller performs overwriting with data equivalent to the excess of one round thereof onto a data stored area of the ring buffer.

7. The semiconductor integrated circuit according to claim 6, wherein the signal processor executes a decode process and an error correction process for generating the read data.

8. The semiconductor integrated circuit according to claim 7, wherein the buffer memory is a dynamic random access memory.

9. The semiconductor integrated circuit according to claim 8, wherein the dynamic random access memory is a synchronous dynamic random access memory.

10. The semiconductor integrated circuit according to claim 9, wherein the synchronous dynamic random access memory is built in the semiconductor integrated circuit.

11. A disk recording and reproducing drive comprising:

a spindle motor capable of rotatably driving a disk;

a pickup capable of executing a writing of data onto the disk and a reading of data from the disk;

a pickup drive motor capable of driving the pickup;

a buffer memory capable of storing therein the data read from the disk and the data written onto the disk; and a semiconductor integrated circuit, wherein the semiconductor integrated circuit comprises:

a signal processor capable of generating the read data according to a process of an RF signal read from the pickup by the data reading; and a servo controller capable of controlling the spindle motor, the pickup and the pickup drive motor in response to a servo error signal read from the pickup, wherein the semiconductor integrated circuit further comprises:

a memory controller supplied with the read data generated from the signal processor and a servo signal generated from the servo controller and coupleable to the buffer memory; and an external interface coupleable to an external device of the semiconductor integrated circuit and coupled to the memory controller, and wherein the memory controller is capable of storing the read data and the servo signal in the buffer memory according to a time division process and transferring the read data and the servo signal stored in the buffer memory according to the time division process to the external device through the external interface.

12. The disk recording and reproducing drive according to claim 11, wherein an output data rate of the read data and the servo signal stored in the buffer memory by the memory controller according to the time division process is settable to a rate higher than an input data rate of the read data and the servo signal supplied from the signal processor and the servo controller to the memory controller.

13. The disk recording and reproducing drive according to claim 12, wherein when a period of a store interrupt has occurred in either of the read data and the servo signal stored in the buffer memory by the memory controller according to the time division process, the memory controller adds flag information indicative of the occurrence of the store interrupt to either thereof and stores the same in the buffer memory.

14. The disk recording and reproducing drive according to claim 13, wherein the servo signal is capable of being stored in a ring buffer configured in the buffer memory by the memory controller.

15. The disk recording and reproducing drive according to claim 14, wherein the memory controller detects whether an amplitude level of the servo signal stored in the ring buffer exceeds a predetermined value, and wherein the memory controller starts the storage of the servo signal in the ring buffer in response to the amplitude level having exceeded the predetermined value and stops the storage of the servo signal in the ring buffer after a predetermined time has elapsed.

16. The disk recording and reproducing drive according to claim 15, wherein when the servo signal exceeds one round of the ring buffer before the memory controller starts the storage of the servo signal in the ring buffer in response to the amplitude level having exceeded the predetermined value, the memory controller performs overwriting with data equivalent to the excess of one round thereof onto a data stored area of the ring buffer.

17. The disk recording and reproducing drive according to claim 16, wherein the signal processor executes a decode process and an error correction process for generating the read data.

18. The disk recording and reproducing drive according to claim 17, wherein the buffer memory is a dynamic random access memory.

19. The disk recording and reproducing drive according to claim 18, wherein the dynamic random access memory is a synchronous dynamic random access memory.

20. The disk recording and reproducing drive according to claim 19, wherein the synchronous dynamic random access memory is built in the semiconductor integrated circuit.

21. An optical disk drive comprising:

pickup means for outputting an electric signal, based on reflected light from laser light applied onto an information recording medium;

analog signal processing means for outputting a servo error signal and an RF signal, based on the electric signal outputted from the pickup means;

read means for generating a reproduction signal, based on the RF signal outputted from the analog signal processing means;

servo control means for calculating a servo control signal using the servo error signal outputted from the analog signal processing means, controlling the pickup means using the servo control signal and outputting any of a servo error calculation signal, a servo calculation control signal and a servo operation status signal or a signal of a combination thereof;

buffer memory means for recording any of the servo error calculation signal, the servo calculation control signal and the servo operation status signal or the signal of the combination thereof, and the reproduction signal;

buffer control means for controlling a recording process and a reading process of the buffer memory means;

system control means for controlling the read means, the servo control means and the buffer control means; and external interface means for performing a transfer of any of the servo error calculation signal, the servo calculation control signal and the servo operation status signal or the signal of the combination thereof, the reproduction signal and control data to and from the buffer control means and the system control means and thereby communicating with the outside of the optical disk drive, wherein any of the servo error calculation signal, the servo calculation control signal and the servo operation status signal or the signal of the combination thereof and the reproduction signal all recorded in the buffer memory means are outputted to the outside of the optical disk drive.

22. An optical disk recording or reproducing method comprising:

a pickup step of outputting an electric signal, based on reflected light from laser light applied onto an information recording medium;

an analog signal processing step of outputting a servo error signal and an RF signal, based on the electric signal outputted from the pickup step;

a read step of generating a reproduction signal, based on the RF signal outputted from the analog signal processing step;

a servo control step of calculating a servo control signal using the servo error signal outputted from the analog signal processing step, controlling the pickup step using the servo control signal and outputting any of a servo error calculation signal, a servo calculation control signal and a servo operation status signal or a signal of a combination thereof;

a buffer memory step of recording any of the servo error calculation signal, the servo calculation control signal and the servo operation status signal or the signal of the combination thereof, and the reproduction signal;

a buffer control step of controlling a recording process and a reading process of the buffer memory step;

a system control step of controlling the read step, the servo control step and the buffer control step; and an external interface step of performing a transfer of any of the servo error calculation signal, the servo calculation control signal and the servo operation status signal or the signal of the combination thereof, the reproduction signal and control data to and from the buffer control step and the system control step and thereby communicating with the outside of an optical disk drive, wherein any of the servo error calculation signal, the servo calculation control signal and the servo operation status signal or the signal of the combination thereof and the reproduction signal all recorded in the buffer memory step are outputted to the outside of an optical disk drive.

23. An optical disk drive comprising:

pickup means for outputting an electric signal, based on reflected light from laser light applied onto an information recording medium;

analog signal processing means for outputting a servo error signal and an RF signal, based on the electric signal outputted from the pickup means;

read means for generating a reproduction signal, based on the RF signal outputted from the analog signal processing means;

servo control means for calculating a servo control signal using the servo error signal outputted from the analog signal processing means, controlling the pickup means using the servo control signal and outputting any of a servo error calculation signal, a servo calculation control signal and a servo operation status signal or a signal of a combination thereof;

buffer memory means for recording any of the servo error calculation signal, the servo calculation control signal and the servo operation status signal or the signal of the combination thereof, and the reproduction signal;

buffer control means for performing a trigger determining process on any of the servo error calculation signal, the servo calculation control signal and the servo operation status signal or the signal of the combination thereof and controlling a recording process and a reading process of the buffer memory means, based on the determination of trigger generation;

system control means for controlling the read means, the servo control means and the buffer control means; and external interface means for performing a transfer of any of the servo error calculation signal, the servo calculation control signal and the servo operation status signal or the signal of the combination thereof, the reproduction signal and control data to and from the buffer control means and the system control means and thereby communicating with the outside of the optical disk drive, wherein any of the servo error calculation signal, the servo calculation control signal and the servo operation status signal or the signal of the combination thereof and the reproduction signal all recorded in the buffer memory means are outputted to the outside of the optical disk drive.

24. An optical disk recording or reproducing method comprising:

a pickup step of outputting an electric signal, based on reflected light from laser light applied onto an information recording medium;

an analog signal processing step of outputting a servo error signal and an RF signal, based on the electric signal outputted from the pickup step;

a read step of generating a reproduction signal, based on the RF signal outputted from the analog signal processing step;

a servo control step of calculating a servo control signal using the servo error signal outputted from the analog signal processing step, controlling the pickup step using the servo control signal and outputting any of a servo error calculation signal, a servo calculation control signal and a servo operation status signal or a signal of a combination thereof;

a buffer memory step of recording any of the servo error calculation signal, the servo calculation control signal and the servo operation status signal or the signal of the combination thereof, and the reproduction signal;

a buffer control step of performing a trigger determining process on any of the servo error calculation signal, the servo calculation control signal and the servo operation status signal or the signal of the combination thereof and controlling a recording process and a reading process of the buffer memory step, based on the determination of trigger generation;

a system control step of controlling the read step, the servo control step and the buffer control step; and an external interface step of performing a transfer of any of the servo error calculation signal, the servo calculation control signal and the servo operation status signal or the signal of the combination thereof, the reproduction signal and control data to and from the buffer control step and the system control step and thereby communicating with the outside of an optical disk drive, wherein any of the servo error calculation signal, the servo calculation control signal and the servo operation status signal or the signal of the combination thereof and the reproduction signal all recorded in the buffer memory step are outputted to the outside of the optical disk drive.

25. An optical disk drive comprising:

pickup means for outputting an electric signal, based on reflected light from laser light applied onto an information recording medium;

analog signal processing means for outputting a servo error signal and an RF signal, based on the electric signal outputted from the pickup means;

read means for generating a reproduction signal, based on the RF signal outputted from the analog signal processing means;

servo control means for calculating a servo control signal using the servo error signal outputted from the analog signal processing means, controlling the pickup means using the servo control signal and outputting any of a servo error calculation signal, a servo calculation control signal and a servo operation status signal or a signal of a combination thereof;

buffer memory means for recording any of the servo error calculation signal, the servo calculation control signal and the servo operation status signal or the signal of the combination thereof, the reproduction signal and the RF signal;

buffer control means for controlling a recording process and a reading process of the buffer memory means;

system control means for controlling the read means, the servo control means and the buffer control means; and external interface means for performing a transfer of any of the servo error calculation signal, the servo calculation control signal and the servo operation status signal or the signal of the combination thereof, the reproduction signal, the RF signal and control data to and from the buffer control means and the system control means and thereby communicating with the outside of the optical disk drive, wherein any of the servo error calculation signal, the servo calculation control signal and the servo operation status signal or the signal of the combination thereof, the reproduction signal and the RF signal all recorded in the buffer memory means are outputted to the outside of the optical disk drive.

26. An optical disk recording or reproducing method comprising:

a pickup step of outputting an electric signal, based on reflected light from laser light applied onto an information recording medium;

an analog signal processing step of outputting a servo error signal and an RF signal, based on the electric signal outputted from the pickup step;

a read step of generating a reproduction signal, based on the RF signal outputted from the analog signal processing step;

a servo control step of calculating a servo control signal using the servo error signal outputted from the analog signal processing step, controlling the pickup step using the servo control signal and outputting any of a servo error calculation signal, a servo calculation control signal and a servo operation status signal or a signal of a combination thereof;

a buffer memory step of recording any of the servo error calculation signal, the servo calculation control signal and the servo operation status signal or the signal of the combination thereof, the reproduction signal and the RF signal;

a buffer control step of controlling a recording process and a reading process of the buffer memory step;

a system control step of controlling the read step, the servo control step and the buffer control step; and an external interface step of performing a transfer of any of the servo error calculation signal, the servo calculation control signal and the servo operation status signal or the signal of the combination thereof, the reproduction signal, the RF signal and control data to and from the buffer control step and the system control step and thereby communicating with the outside of an optical disk drive, wherein any of the servo error calculation signal, the servo calculation control signal and the servo operation status signal or the signal of the combination thereof, the reproduction signal and the RF signal all recorded in the buffer memory step are outputted to the outside of the optical disk drive.

27. An optical disk drive comprising:

pickup means for outputting an electric signal, based on reflected light from laser light applied onto an information recording medium;

analog signal processing means for outputting a servo error signal and an RF signal, based on the electric signal outputted from the pickup means;

read means for generating a reproduction signal, based on the RF signal outputted from the analog signal processing means;

servo control means for calculating a servo control signal using the servo error signal outputted from the analog signal processing means, controlling the pickup means using the servo control signal and outputting any of a servo error calculation signal, a servo calculation control signal and a servo operation status signal or a signal of a combination thereof;

buffer memory means for recording any of the servo error calculation signal, the servo calculation control signal and the servo operation status signal or the signal of the combination thereof, the reproduction signal and the RF signal;

buffer control means for performing a trigger determining process on any of the servo error calculation signal, the servo calculation control signal and the servo operation status signal or the signal of the combination thereof and controlling a recording process and a reading process of the buffer memory means, based on the determination of trigger generation;

system control means for controlling the read means, the servo control means and the buffer control means; and external interface means for performing a transfer of any of the servo error calculation signal, the servo calculation control signal and the servo operation status signal or the signal of the combination thereof, the reproduction signal, the RF signal and control data to and from the buffer control means and the system control means and thereby communicating with the outside of the optical disk drive, wherein any of the servo error calculation signal, the servo calculation control signal and the servo operation status signal or the signal of the combination thereof, the reproduction signal and the RF signal all recorded in the buffer memory means are outputted to the outside of the optical disk drive.

28. An optical disk recording or reproducing method comprising:

a pickup step of outputting an electric signal, based on reflected light from laser light applied onto an information recording medium;

an analog signal processing step of outputting a servo error signal and an RF signal, based on the electric signal outputted from the pickup step;

a read step of generating a reproduction signal, based on the RF signal outputted from the analog signal processing step;

a servo control step of calculating a servo control signal using the servo error signal outputted from the analog signal processing step, controlling the pickup step using the servo control signal and outputting any of a servo error calculation signal, a servo calculation control signal and a servo operation status signal or a signal of a combination thereof;

a buffer memory step of recording any of the servo error calculation signal, the servo calculation control signal and the servo operation status signal or the signal of the combination thereof, the reproduction signal and the RF signal;

a buffer control step of performing a trigger determining process on any of the servo error calculation signal, the servo calculation control signal and the servo operation status signal or the signal of the combination thereof and controlling a recording process and a reading process of the buffer memory step, based on the determination of trigger generation;

a system control step of controlling the read step, the servo control step and the buffer control step; and an external interface step of performing a transfer of any of the servo error calculation signal, the servo calculation control signal and the servo operation status signal or the signal of the combination thereof, the reproduction signal, the RF signal and control data to and from the buffer control step and the system control step and thereby communicating with the outside of an optical disk drive, wherein any of the servo error calculation signal, the servo calculation control signal and the servo operation status signal or the signal of the combination thereof, the reproduction signal and the RF signal all recorded in the buffer memory step are outputted to the outside of the optical disk drive.

29. The optical disk drive according to claim 21, wherein the servo control means comprises:

any or a combination of waveform data output means for outputting the servo error calculation signal; logic signal output means for outputting the servo calculation control signal; and status information output means for outputting the servo operation status signal.

30. The optical disk drive according to claim 21, wherein the servo control means outputs any of a plurality of the servo error calculation signals, a plurality of the servo calculation control signals and a plurality of servo operation status signals or signals of combinations thereof.

31. The optical disk drive according to claim 21, wherein the servo control means comprises: any or a combination of waveform data output means for outputting the servo error calculation signal; logic signal output means for outputting the servo calculation control signal; and status information output means for outputting the servo operation status signal, and wherein the servo control means outputs any of a plurality of the servo error calculation signals, a plurality of the servo calculation control signals and a plurality of servo operation status signals or signals of combinations thereof.

32. The optical disk drive according to claim 21, wherein the buffer control means comprises:

reproduction signal processing means for buffering the reproduction signal;

servo monitor signal processing means for performing a signal sorting-out process to thereby generate a recording servo monitor signal;

memory access control means for selecting the reproduction signal or the recording servo monitor signal recorded in the buffer memory means and read from the buffer memory means and controlling a recording process and a reading process of the buffer memory means; and sampling control means for outputting a sampling clock signal to each of the reproduction signal processing means, the servo monitor signal processing means and the memory access control means, wherein the memory access control means generates a buffer control status signal indicative of a control operation state, wherein the servo monitor signal processing means performs a process of sorting out the servo error calculation signal, the servo calculation control signal, the servo operation status signal and the buffer control status signal, and wherein the buffer memory means records the recording servo monitor signal therein, and the external interface means performs communication with the outside of the optical disk drive.

33. The optical disk drive according to claim 32, wherein the servo monitor signal processing means converts a bit precision of the servo error calculation signal.

34. The optical disk drive according to claim 32, wherein the servo monitor signal processing means rearranges the servo error calculation signal, the servo calculation control signal, the servo operation status signal and the buffer control status signal when the recording servo monitor signal is generated.

35. The optical disk drive according to claim 32, wherein the memory access control means stores the recording servo monitor signal and the reproduction signal in the buffer memory means on a time-division basis.

36. The optical disk drive according to claim 35, wherein the memory access control means outputs the recording servo monitor signal and the reproduction signal stored in the buffer memory means to the external interface means on a time-division basis.

37. The optical disk drive according to claim 32, wherein the servo monitor signal processing means thins out the servo error calculation signal, the servo calculation control signal and the servo operation status signal outputted from the servo control means to perform sampling.

38. The optical disk drive according to claim 32, wherein the buffer control status signal is a discontinuous generation flag indicative of generation of discontinuity of data recording in the buffer memory means.

39. The optical disk drive according to claim 32, wherein the buffer memory means comprises a recording servo monitor signal recording area for storing the recording servo monitor signal in an area different from a reproduction signal recording area for storing the reproduction signal.

40. The optical disk drive according to claim 39, wherein the recording servo monitor signal recording area is a ring buffer configuration.

41. The optical disk drive according to claim 32, comprising:

a buffer memory setting step of setting parameters for designating the recording servo monitor signal recording area to the buffer memory means;

a servo monitor signal setting step of setting the type, number and bit precision of the servo error calculation signal, the servo calculation control signal and the servo operation status signal stored in the buffer memory means, and parameters for designating a data format of the recording servo monitor signal; and a sampling setting step of setting a parameter for designating the frequency of the sampling clock signal to the sampling control means.

42. The optical disk drive according to claim 23, wherein when the buffer control means performs a trigger determining process, the buffer control means uses a trigger determination target signal, a trigger edge, a trigger level and a delay time as parameters for the trigger determining process.

43. The optical disk drive according to claim 42, wherein when the buffer control means performs a trigger determining process, the buffer control means uses a sampling number as a delay time corresponding to a parameter for the trigger determining process.

44. The optical disk drive according to claim 23, wherein during a period taken until a trigger is detected by the trigger determining process, the buffer control means does not perform reading of any of the servo error calculation signal, the servo calculation control signal and the servo operation status signal or the signal of the combination thereof recorded in the buffer memory means and does not perform the output of the same to the external interface means.

45. The optical disk drive according to claim 23, wherein the buffer control means generates a trigger generation flag indicative of a trigger generation state as a buffer control status signal indicative of a control operation state, and wherein the buffer memory means records the buffer control status signal comprising the trigger generation flag, and the external interface means performs communication with the outside of the optical disk drive.

* * * * *